United States Patent
Suzuki et al.

[11] Patent Number: 6,138,345
[45] Date of Patent: Oct. 31, 2000

[54] CONNECTION PIN INSERTING-AND-EXTRACTING APPARATUS HAVING A CONNECTION-PIN HOLDING MECHANISM, A DRIVING MECHANISM DRIVING THE HOLDING MECHANISM AND A FRAME ON WHICH THE HOLDING MECHANISM AND DRIVING MECHANISM ARE MOUNTED

[75] Inventors: Toshihiro Suzuki, Kawasaki; Naoto Kaneko, Yokohama; Eiichi Kakihara, Kawasaki; Koichi Shimamura, Kawasaki; Yasunori Hachiyama, Kawasaki; Hirofumi Oosawa, Kawasaki; Hitoshi Isobe, Kawasaki, all of Japan

[73] Assignee: Fujitsu Limited, Kawasaki, Japan

[21] Appl. No.: 09/025,625

[22] Filed: Feb. 18, 1998

Related U.S. Application Data

[62] Division of application No. 08/662,011, Jun. 12, 1996, Pat. No. 5,790,651.

[30] Foreign Application Priority Data

Nov. 14, 1995 [JP] Japan .................................. 7-295476
Nov. 17, 1995 [JP] Japan .................................. 7-299860

[51] Int. Cl.[7] .................................................. H05K 3/30
[52] U.S. Cl. ................................ 29/739; 29/740; 29/741; 29/744
[58] Field of Search ............................. 29/739, 740, 741, 29/744; 318/568.21

[56] References Cited

U.S. PATENT DOCUMENTS

| | | | |
|---|---|---|---|
| 4,437,232 | 3/1984 | Araki et al. | 29/740 |
| 4,611,397 | 9/1986 | Janisiewicz et al. | 29/740 X |
| 4,705,311 | 11/1987 | Ragard | 29/740 X |
| 4,733,459 | 3/1988 | Tateno | 29/741 |
| 4,810,018 | 3/1989 | Van De Ven et al. | 29/740 X |
| 4,831,721 | 5/1989 | Hirai et al. | 29/740 |
| 5,088,187 | 2/1992 | Takata et al. | 29/740 X |
| 5,092,031 | 3/1992 | Sato et al. | 29/739 X |
| 5,153,983 | 10/1992 | Oyama | 29/740 |
| 5,160,877 | 11/1992 | Fujiwara et al. | 318/568.21 |
| 5,195,235 | 3/1993 | Mifuji | 29/740 |
| 5,509,192 | 4/1996 | Ota et al. | 29/741 |
| 5,724,722 | 3/1998 | Hashimoto | 29/741 X |

FOREIGN PATENT DOCUMENTS

| | | |
|---|---|---|
| 2 648 300 | 12/1990 | France . |
| 44 02 365 | 8/1995 | Germany . |
| 59-068994 | 4/1984 | Japan . |
| 3-104397 | 5/1991 | Japan . |
| 8-187625 | 7/1996 | Japan . |

*Primary Examiner*—Lee Young
*Assistant Examiner*—Rick Kiltae Chang
*Attorney, Agent, or Firm*—Staas & Halsey LLP

[57] ABSTRACT

A matrix-switch-board unit has two wiring-pattern arrays which are respectively formed in opposite sides of the unit so as to be electrically isolated from and to cross each other, respective through holes extending between and through the crossing portions of the wiring pattern arrays on the opposite sides of the unit. A connection pin inserting and extracting device automatically and selectively inserts a connection pin into a selected one of the through holes for interconnecting the corresponding opposed, crossing pattern portions and extracts a connection pin from a corresponding one of the through holes for disconnecting same. Pivotally mounted toggle arms of the device have respective ends with laterally extending hook portions in opposed relationship and are rotatable in a first sense to engage a pin between the hook portions and in an opposite sense to release a connection pin engaged thereby.

19 Claims, 24 Drawing Sheets

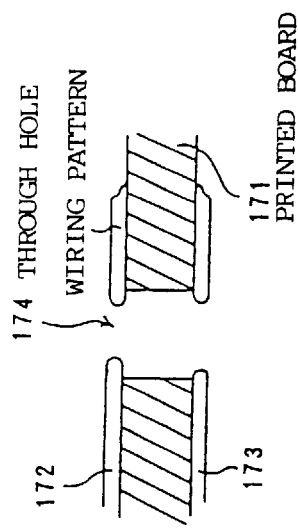
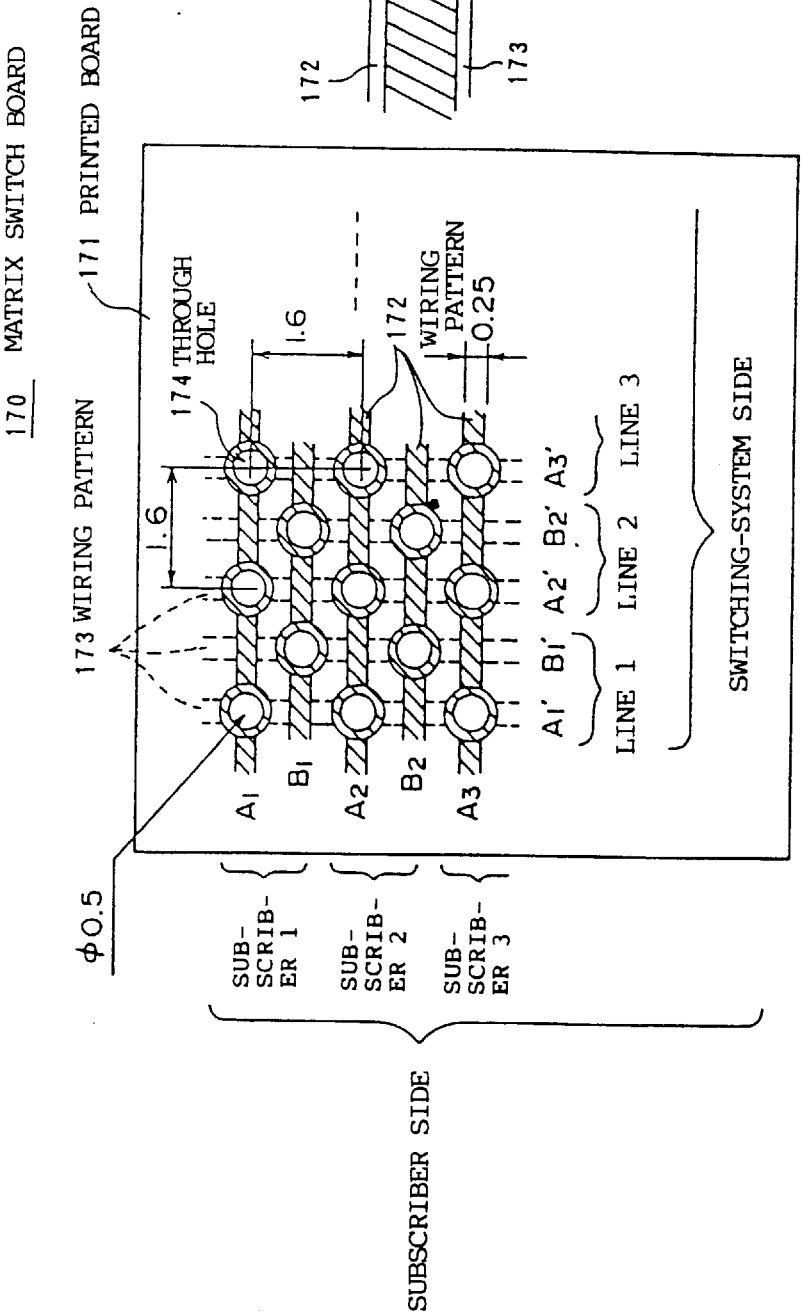

CONNECTION PIN INSERTING-AND-EXTRACTING APPARATUS HAVING A CONNECTION-PIN HOLDING MECHANISM, A DRIVING MECHANISM DRIVING THE HOLDING MECHANISM AND A FRAME ON WHICH THE HOLDING MECHANISM AND DRIVING MECHANISM ARE MOUNTED

This application is a division of Ser. No. 08/662,011 filed Jun. 12, 1996 now U.S. Pat. No. 5,790,651.

BACKGROUND OF THE INVENTION

1. Field of the Invention

The present invention generally relates to automatic distribution equipment, and more particularly, to automatic distribution equipment which has a function of automatically connecting and disconnecting a subscriber and a switching system using a robot.

The present invention further relates to a connection-pin inserting-and-extracting apparatus which automatically forms a selected path by inserting a connection pin into a matrix switch board, and more particularly, to a connection-pin inserting-and-extracting apparatus including a connection-pin holding device which has sufficient connection-pin holing performance and has possibilities of miniaturization and cost reduction.

2. Description of the Related Art (1) Automatic Distribution Equipment

First, a description will be given of prior-art automatic distribution equipment, by referring to FIG. 1 to FIG. 6.

FIG. 1 shows an illustration for explaining a typical function of a main distributing frame (MDF). The MDF is equipment for flexibly connecting a plurality of subscriber-side terminals and subscriber circuits located in a switching system. In the MDF, when a new subscriber is applied, the new subscriber is connected with the switching system, and when an address or a telephone number of the subscriber is changed, the connection between the subscriber and the switching system is changed. The connection changing may be carried out during an operation of the switching system. For efficient connection changing, the number of subscriber-side terminals (for example, X=3600 terminals) provided in the MDF is commonly larger than that of switching-system-side terminals (for example, Y=2100 terminals).

In the conventional MDF, as shown in FIG. 1, two terminal boards are provided. The subscriber and one terminal board are connected by a pair of cables, and the other terminal board and the switching system are also connected by a pair of cables. Further, the above two terminal boards are manually connected by a maintenance man using jumper wires to connect the subscriber and the switching system. Therefore, for the above-discussed connection work, a specially-skilled engineer is required. There is thus a problem that when the MDF is located in a remote area or an unmanned exchange office of an isolated island, it takes a long time to send the maintenance man, and the connection work for a variety of services, for example, telephone service, may not quickly be carried out. Further, since the above connection work is carried out mainly during the operation of the switching system, an errorless work is required. Accordingly, it takes a long time for that connection work. To overcome these problems, recently, an automatic MDF is developed, wherein a jumpering work is carried out by a robot.

FIG. 2 to FIG. 4 show a configuration example of a first prior-art automatic MDF. FIG. 2 shows a principle of the first prior-art automatic MDF. FIG. 3A to FIG. 3C show configurations of a prior-art matrix switch board and a connection pin used in the first prior-art automatic MDF. More specifically, FIG. 3A shows the configuration of the prior-art matrix switch board, FIG. 3B shows the configuration of the prior-art connection pin, and FIG. 3C shows an illustration indicating a condition in which the connection pin is inserted into the matrix switch board. FIG. 4 shows a configuration of the first prior-art automatic MDF.

As shown in FIG. 2, in the first prior-art automatic MDF, instead of the terminal board for the jumpering, a matrix switch board (MB) is provided. The matrix switch board is constructed with a multilayer-structure-type board, wherein a plurality of subscriber-side wires X and a plurality of switching-system-side wires Y are arranged in different layers so that the wires X, Y cross at substantially a right angle. At each cross point, a cross-point through hole is provided in the board, wherein by inserting a connection pin into the cross-point through hole, a desired subscriber-side wire X can be connected to a desired switching-system-side wire Y. In the automatic MDF, an inserting operation of the connection pin is automatically carried out by a robot.

When, for example, in one matrix switch board, 3600 terminals on the subscriber side and 2100 terminals on the switching system side are provided, 7.50-million cross-point holes need to be provided. In this case, robot control is subjected to a large amount of load. Therefore, in practical use, by arranging a plurality of small-sized matrix switch boards in a network-structure formation based on a given rule, substantially the same function is realized. In this method, the number of the cross-point holes may extremely be reduced.

Such a matrix switch board, as shown in FIG. 3A and FIG. 3C, is constructed with a printed wiring board having 4 conductive layers. In general, a connection between the subscriber and the switching system is wired by two wires designated A line and B line, and for high efficiency, the two wires are simultaneously connected. Therefore, the prior-art matrix switch board has the subscriber-side wires provided with the two layers (the A-line X layer and B-line X layer) and the switching-system-side wires provided with the two layers (the A-line Y layer and B-line Y layer), wherein the two groups of wires cross at substantially a right angle. At each cross point of these wires, a hole penetrating the printed wiring board is provided. In the prior-art matrix switch board, an interval of distance between adjacent holes in the printed wiring board is approximately 1.5 mm.

The prior-art connection pin has, as shown in FIG. 3B, two cylindrical connection springs a, b arranged in series in an axial direction. By inserting the connection pin into the cross-point hole of the matrix switch board, as shown in FIG. 3C, both connections between the subscriber-side A line and the switching-system-side A line and between the subscriber-side B line and the switching-system-side B line can simultaneously be wired. The prior-art connection pin has approximately an 8.7-mm length and is approximately 1.2 mm in diameter.

In the first prior-art automatic MDF, as shown in FIG. 4, a plurality of matrix switch boards 1 are dimensionally arranged so as to form one flat board. Two such flat boards are arranged on opposite sides of an apparatus 4 accommodating a robot 3 for inserting a connection pin 2. The robot 3 searches for a designated cross-point hole 5 in the flat board, and inserts the connection pin 2 into the designated cross-point hole 5. The connection pin 2 mounted in the robot 3 can turn in an opposite-side direction, and can also be inserted into the matrix switch board of the flat board arranged on the opposite side. Because the connection between the subscriber-side line and the switching-system-side line is carried out mainly during the operation of the switching system, one connection pin 2 is inserted for one transmission line to be connected. Since in the above-mentioned automatic MDF, a plurality of the matrix switch boards are dimensionally arranged, a width of the flat board may be several meters.

FIG. 5 shows a block diagram of the first prior-art automatic MDF shown in FIG. 4. The automatic MDF is constructed with a connection-path switching section 6 including the matrix switch board 1, the robot 3, and the robot-accommodating apparatus 4, a control section 7, a main storage device 8a, and a sub storage device 8b. Also, an operation terminal 9 is connected to the automatic MDF. In the automatic MDF, when an order to connect the subscriber-side line and the switching-system-side line is issued from the operation terminal 9, the control section 7 controls the connection-path switching section 6 according to contents of the main storage device 8a and the sub storage device 8b.

FIG. 6 shows a perspective view of a second prior-art automatic MDF. The second prior-art automatic MDF is disclosed in Japanese Laid-Open Patent Application No.3-104397. In the second prior-art automatic MDF, a plurality of matrix switch boards 1' are positioned in a vertical direction, and are arranged in a horizontal direction. A robot 3' which is movable in the vertical and horizontal directions is installed on the outside of the automatic MDF. Therefore, when the robot 3' inserts the connection pin into the matrix switch board 1' to carry out the connecting operation, the designated matrix switch board 1' having a designated cross-point hole is extracted out of the MDF, and in that condition, the connection pin is inserted into the cross-point hole.

In the second prior-art automatic MDF, because a plurality of matrix switch boards are three-dimensionally arranged, a large number of matrix switch boards may be accommodated.

However, the above-discussed prior-art automatic distribution equipment has the following problems.

In the first prior-art automatic distribution equipment, the matrix switch boards are dimensionally arranged. Therefore, a large number of matrix switch boards cannot be carried, and a carrying efficiency is degraded. Also, since a moving area of the robot is relatively wide, a function of searching for a position of the robot is complicated, and a size of the robot increases. Accordingly, there is a problem in that the robot may not efficiently be controlled, and the automatic distribution equipment becomes expensive.

In the second prior-art automatic distribution equipment, the matrix switch boards are three-dimensionally arranged, and the moving area of the robot is relatively narrow. However, to insert the connection pin, the matrix switch board needs to be extracted. Therefore, a long cable for connecting the extracted matrix switch board and a body of the equipment is necessary. This cable needs to include thousands of lines. Accordingly, there is a problem in that a mechanism of extracting the matrix switch board is significantly complicated.

Also, in the second prior-art automatic distribution equipment, a given period of time for extracting the matrix switch board is necessary. Namely, even if the robot is initially located adjacent to the designated matrix switch board, it takes the given period of time for extracting the matrix switch board before inserting the connection pin. Therefore, when many connection pins are inserted and extracted, an operation efficiency of the automatic MDF may be degraded.

Further, in the above-discussed first and second prior-art automatic distribution equipment, the matrix switch board including 4-layer wiring patterns is used. This matrix switch board is complex, and the manufacturing yield is degraded (i.e. low). There is a problem in that the matrix switch board is expensive.

Furthermore, the connection pin used in the first and second prior-art automatic distribution equipment needs to have two connection parts. Therefore, it is necessary to fix ring-type connection members to a plastic rod with maintaining a joint property. Therefore, there is thus a problem in that assembling of the connection pin is difficult, and, thus, cost thereof increases.

(2) Connection-Pin Inserting-and-Extracting Apparatus

Next, a description will be given of a connection-pin inserting-and-extracting apparatus, by referring to FIG. 7A to FIG. 8.

As discussed above, to establish a proper circuit by connecting and disconnecting conductive patterns at a given position in a telephone switching system, for example, there is a method of connecting a plurality of conductive patterns previously formed in the matrix switch board by inserting the connection pin into the cross-point hole.

For example, the matrix switch board has a plurality of conductive patterns which are arranged on opposite sides of the board so as to cross each other at the same coordinates. Also, by pressing and inserting the cylindrical connection pin having elasticity into a through hole formed in a cross point (cross-point hole), the connection between the conductive patterns may be carried out.

Further, when disconnecting the connected conductive patterns, the conductive patterns are disconnected by extracting the connection pin inserted in the through hole. Operations of inserting and extracting the connection pin are automatically carried out by a computer-controlled connection-pin inserting-and-extracting apparatus.

However, as shown in FIG. 3B, this connection pin is provided with the two cylindrical connection springs arranged in series in an axial direction. The two cylindrical connection springs are fixed to the body of a plastic rod while maintaining a joint property. Therefore, for forming the connection springs, a high quality and complex manufacturing technology is required. As a result, a cost of the connection pin increases, and there is thus a problem in that the cost of the connection-pin inserting-and-extracting apparatus may not be reduced.

FIG. 7A shows a cross-sectional view of a prior-art connection-pin holding device and FIG. 7B shows a bottom view of the prior-art connection-pin holding device. FIG. 8 shows an expanded illustration of a part of the prior-art connection-pin holding device shown in FIG. 7A.

A connection pin 20 used in the prior-art connection-pin holding device is constructed with a connection-pin body 21 and two cylindrical connection springs 22. The cylindrical connection springs 22 are fixed to the connection-pin body 21 made of a resin so as to have elasticity, and are electrically isolated from each other.

As shown in FIG. 7A, the prior-art connection-pin holding device includes a double-structure frame 10 having an outer frame 11 and an inner frame 12. In the inner frame 12, a front face thereof is supported through a pivot 13, and a back face, both-side faces, and a rear face are supported through a coil spring 14.

The inner frame 12 is provided with a holding mechanism 32 which has a plurality of swinging members 31 and holds the connection pin 20, and a driving mechanism 33. The swinging members 31 are arranged in a radial manner around the connection pin 20, and also, the middle part of each swinging member 31 is supported in a rotatable manner in the front face of the inner frame 12.

The driving mechanism 33 is installed inside the inner frame 12 perpendicularly to the matrix switch board, and is formed by an electromagnetic solenoid. Also, a plunger 34 is supported by the inner frame 12 in a slidable manner, and is pressed by a pressing coil spring 35 in a projected direction.

Each swinging member 31, whose middle part is supported in a rotatable manner, has a holding pawl 36 holding the connection pin 20 by contacting a side face of the connection pin 20 on a matrix-switch-board side of the swinging members 31. The plunger 34 is provided in a center of the holding mechanism 32, and has, in a top-end area, a member 37 relationally coupling with levers 38 formed on an opposite side of the holding pawls 36.

Before power is supplied to the driving mechanism 33, as shown in FIG. 8, the plunger 34 is projected to a given position by an operation of the pressing coil spring 35. At this time, respective levers 38 are pressed by the plunger 34 so as to rotate the swinging members 31. As a result, the holding pawls 36 holding the connection pin 20 are opened.

When the resin part of the connection pin 20 is inserted between the holding pawls 36, and when the power is supplied to the driving mechanism 33, the projected plunger 34 draws back. Accordingly, as shown in FIG. 7A and FIG. 7B, a plurality of the swinging members 31 simultaneously rotate. As a result, the holding pawls 36 contact the surrounding face of the connection pin 20 so as to hold the connection pin 20.

The outer frame 11 of the connection-pin holding device is fixed on a bracket (not shown) which is movable in X, Y, and Z axial directions. In this case, for example, the connection pin 20 may easily be inserted into the through hole by lowering the whole connection-pin holding device after the connection pin 20 is positioned above the through hole.

A plurality of the coil springs 14 are provided between the outer frame 11 and the inner frame 12 of the connection-pin holding device for compensating for position shift. When the inner frame 12 is raised up by a reaction of the connection-pin insertion, the inner frame 12 is separated from the pivots 13 on the outer frame 11 so as to compensate for the position shift.

When the connection pin previously inserted into the matrix switch board is extracted, the holding mechanism 32 is positioned at the connection pin 20, and the whole connection-pin holding device holding the connection pin is raised up. As a result, the connection pin is extracted from the matrix switch board.

However, since the prior-art connection-pin holding device has the swinging members 31 arranged in a radial manner around the connection pin, an external form of the holding mechanism 32 is relatively large. Further, since a plurality of the holding pawls 36 contact the surrounding face of the connection pin to hold the connection pin, high precision manufacturing techniques are required for forming the holding mechanism 32.

Since in the holding mechanism 32, a plurality of the holding pawls 36 contact the surrounding face of the connection pin to hold the connection pin, sufficient strength for holding the connection pin is required for the holding mechanism 32. Therefore, for the driving mechanism 33, there is a need for a large electromagnetic solenoid which can apply large strength to the swinging members 31 by drawing the plunger 34 against the pressing coil spring 35.

Further, in the prior-art connection-pin holding device, for compensating for the position shift, the frame 10 is constructed with the double structure of the outer frame 11 and the inner frame 12. Since a plurality of the coil springs 14 are provided between the outer frame 11 and the inner frame 12, there is a problem in that the external form of the connection-pin holding device is relatively large.

SUMMARY OF THE INVENTION

It is an object of this invention to provide automatic distribution equipment which efficiently connects a large number of lines to each other in a short time and at a low cost and, in which the disadvantages described above are eliminated.

It is another object of the present invention to provide a connection-pin inserting-and-extracting apparatus including a connection-pin holding device. The apparatus can positively hold a connection pin having two pins, and can insert the connection pin into a matrix switch board with high precision. Also, the size of the device can be miniaturized, and the cost of the device may be reduced. This permits the disadvantages described above to be eliminated.

The object described above is achieved by automatic distribution equipment for connecting and disconnecting lines comprising a frame body; a plurality of matrix-switch-board units arranged in the frame body in a stack formation, each of the matrix-switch-board units having two wiring-pattern arrays which are formed in opposite sides of each of the units so as to be electrically isolated from each other and to cross each other, wherein when a connection pin is inserted into one of through holes formed at cross points of the two wiring-pattern arrays, respective wiring patterns of the two wiring-pattern arrays are connected to each other; and a robot, provided in a side of the frame body, which moves between two of the matrix-switch-board units, and inserts-and-extracts the connection pin into-and-from a designated through hole to connect-and-disconnect designated lines.

According to the above automatic distribution equipment, a plurality of matrix-switch-board units are three-dimensionally arranged. Therefore, a large number of matrix switch boards may efficiently be assembled. Also, since a moving area of the robot may be relatively narrow, the robot may be controlled with high speed and high efficiency. As a result, cost of the robot may be reduced.

Further, when the robot inserts the connection pin into the designated through hole, it is unnecessary to extract the matrix-switch-board unit from the frame. Therefore, each matrix-switch-board unit may be connected with the frame through a short cable. Also, a complex extracting mechanism of the matrix-switch-board unit is unnecessary.

Furthermore, since the matrix-switch-board unit does not need to be extracted from the frame, when the designated through hole is positioned adjacent to the robot, a line-connecting-and-disconnecting process may be carried out in a short time.

The object described above is also achieved by the equipment mentioned above, wherein the robot comprises an elevator part moving in a front space in the frame body in a first direction in which the matrix-switch-board units are stacked; an arm part which extends from the elevator part over any one of the matrix-switch-board units and can be accommodated in a side space of the matrix-switch-board units; and a head part, provided on the arm part, for holding the connection pin; wherein when the elevator part moves in the first direction, the arm part moves in a space between respective side ends of the matrix-switch-board units and a side wall of the frame body.

According to the above automatic distribution equipment, the arm part of the robot can be accommodated in the side space of the matrix-switch-board units. Therefore, the robot may smoothly move in the direction which the matrix-switch-board units are stacked.

The object described above is also achieved by the equipment mentioned above, wherein the robot comprises an elevator part moving in a front space in the frame body in a first direction in which the matrix-switch-board units are stacked; an arm part which extends from the elevator part over any one of the matrix-switch-board units and can be accommodated in the front space in the frame body; and a head part, provided on the arm part, for holding the connection pin; wherein when the elevator part moves in the first direction, the arm part moves in the front space in the frame body.

According to the above automatic distribution equipment, the arm part of the robot may be accommodated in the front space in the frame body. Therefore, the matrix-switch-board unit may positively be fixed to the frame body on three sides of the unit.

The object described above is also achieved by the equipment mentioned above, wherein the robot comprises two heads for inserting the connection pin into the matrix-switch-board unit in upward and downward directions, respectively wherein spaces formed in between two of the matrix-switch-board units include at least a first space and a second space, the robot not being movable in the first space, and the robot being movable in the second space, and a height of the first space being less than a height of the second space.

The object described above is also achieved by the equipment mentioned above, wherein the robot comprises a rotatable head for inserting the connection pin into the matrix-switch-board unit in upward and downward directions, respectively, wherein spaces formed in between two of the matrix-switch-board units includes at least a first space and a second space, the robot not being movable in the first space, and the robot being movable in the second space, and a height of the first space being less than a height of the second space.

According to the above automatic distribution equipment, the robot has the two heads or one rotatable head, and the height of the first space where the robot is not movable is less than the height of the second space where the robot is movable. Therefore, the matrix-switch-board units may be mounted with high density.

The object described above is also achieved by the equipment mentioned above, wherein the matrix-switch-board unit comprises a main board having a first unit input-and-output terminal; and a plurality of matrix switch boards, each including the two wiring-pattern arrays which are respectively formed in opposite sides of the matrix switch board so as to be electrically isolated from each other and to cross each other, wherein when the connection pin is inserted into one of the through holes formed at the cross points of the two wiring-pattern arrays, respective wiring patterns of the two wiring-pattern arrays are connected to each other; wherein the plurality of matrix switch boards are connected to the main board through connectors, and are connected to the first unit input-and-output terminal through internal wires formed in the main board.

The object described above is also achieved by the equipment mentioned above, wherein the matrix-switch-board unit is constructed with one board comprising a plurality of matrix switch parts, each including the two wiring-pattern arrays which are respectively formed in opposite sides of the matrix switch part so as to be electrically isolated from each other and to cross each other, wherein when the connection pin is inserted into one of the through holes formed at the cross points of the two wiring-pattern arrays, respective wiring patterns of the two wiring-pattern arrays are connected to each other; switch-part input-and-output terminals provided corresponding to respective matrix switch parts; and a first unit input-and-output terminal for an interface with external devices; wherein when the matrix-switch-board unit is used, the switch-part input-and-output terminals are connected with the first unit input-and-output terminal.

According to the above automatic distribution equipment, the matrix-switch-board units may easily include a plurality of matrix switch boards or a plurality of matrix switch parts. Therefore, by using such matrix-switch-board units, a network structure of the matrix switch boards may easily be realized, and in that network structure, a large number of lines with high density may be constructed.

The object described above is also achieved by the equipment mentioned above, wherein the first unit input-and-output terminal is formed as one body in one side of the matrix-switch-board unit.

According to the above automatic distribution equipment, each matrix-switch-board unit may efficiently be connected with external devices.

The object described above is also achieved by the equipment mentioned above, wherein the matrix-switch-board unit further comprises a second unit input-and-output terminal which has substantially the same connecting structure as that of the first unit input-and-output terminal.

According to the above automatic distribution equipment, the second unit input-and-output terminal may be used for connecting between the matrix-switch-board units. Therefore, the network structure of the matrix switch boards may easily be realized, and in that network structure, a large number of lines with high density may be constructed.

The object described above is also achieved by the equipment mentioned above, wherein the matrix-switch-board unit further has an exchangeable pin-supplying board for accommodating the connection pins.

According to the above automatic distribution equipment, the connection pin may efficiently be supplied to the robot. Therefore, an operation time of the robot may be reduced.

The object described above is also achieved by the equipment mentioned above, wherein the matrix-switch-board unit has a two-layer structure, wherein a pair of adjoining wiring patterns in each of the wiring-pattern arrays is allocated to one of the lines, and when the designated line is connected and disconnected, two pairs of the adjoining wiring patterns in the opposite sides' wiring-pattern arrays are substantially simultaneously connected and disconnected by the connection pin.

The object described above is also achieved by the equipment mentioned above, wherein the connection pin comprises two connecting members electrically isolated from each other, wherein the two connecting members are simultaneously inserted-and-extracted into-and-from two of the through holes formed at the cross points of the two pairs of adjoining two wiring patterns to connect-and-disconnect the designated line.

According to the above automatic distribution equipment, the two-layer structure board is used for the matrix-switch-board unit, and two pairs of lines may simultaneously be connected and disconnected. Therefore, without degrading a highly efficient connecting operation in the board, the cost of the board may be reduced.

The object described above is also achieved by the equipment mentioned above, further comprising a control unit for controlling the robot in a side wall in the frame body, and a power-supply unit for supplying power to the robot and the control unit positioned higher in the frame body.

According to the above automatic distribution equipment, a mounting space in the frame body may be used efficiently. Therefore, this automatic distribution equipment may be miniaturized as compared to another equipment externally having the control unit and the power-supply unit.

The object described above is also achieved by the equipment mentioned above, further comprising a control unit successively carrying out an inserting-and-extracting operation of the connection pin from the through hole nearest a present position of the robot when the inserting-and-extracting operation is carried out for a plurality of through holes.

According to the above automatic distribution equipment, a time for the inserting-and-extracting operation of the connection pin may be reduced.

The object described above is also achieved by a connection-pin inserting-and-extracting apparatus including a connection-pin holding device which holds a connection pin for an inserting-and-extracting process into-and-from a matrix switch board and has a holding mechanism holding the connection pin, a driving mechanism driving the holding mechanism, and a frame having mounted thereon the holding mechanism and the driving mechanism, wherein the holding mechanism comprises: a sleeve having one end part in which slits and nail parts are formed, and the other end part in which a fixing part mounted to the frame is formed; a pair of swinging members facing each other, each including a hook and a lever, and a middle part of each being mounted to the frame in a rotatable manner; and twisting coil springs which are mounted between the respective swinging members and the frame, and which push the swinging members so as to open the hooks; and the driving mechanism comprises: a push rod supported by the frame and the sleeve in a slidable manner; an armature which is made of an electromagnetic substance and is mounted to one end part of the push rod in a swinging manner; an electromagnet fixed to the frame so that a magnetic pole of the electromagnet faces the armature; and a pressing coil spring pushing the push rod so as to separate the armature from the electromagnet; wherein when the connection pin is inserted between the nail parts of the sleeve, the push rod moves, the armature contacts the electromagnet, and a projection formed in the push rod pushes the levers of the swinging members to close the hooks.

According to the above connection-pin inserting-and-extracting apparatus, the connection pin to be inserted is supported by the sleeve so as not to fall. Further, by the push rod fixed to the frame through the armature and the electromagnet, the connection pin is inserted.

When the connection pin previously inserted is extracted from the matrix switch board, the connection pin is hooked by the hooks of the swinging members. Therefore, different from a prior-art connection-pin holding device, it is unnecessary to hold the connection pin by applying a large strength to the holding mechanism for inserting and extracting the connection pin.

Further, the connection-pin holding mechanism is constructed with the sleeve and a pair of swinging members. In the one end of the sleeve, the slits and the nail parts are formed, and the other end thereof is mounted to the frame. The swinging member has the hook and the lever, and the middle part of the swinging member is mounted to the frame. Therefore, the connection-pin holding mechanism may be extremely be miniaturized, and may be manufactured without complex manufacturing techniques. As a result, the cost of the connection-pin holding device may be reduced.

Other objects and further features of the present invention will be apparent from the following detailed description when read in conjunction with the accompanying drawings.

BRIEF DESCRIPTION OF THE DRAWINGS

FIG. 3A shows the configuration of the prior-art matrix switch board, FIG. 3B shows the configuration of the prior-art connection pin, and FIG. 3C shows an illustration indicating a condition where the connection pin is inserted into the matrix switch board;

FIG. 13A shows a top plan view of the matrix-switch-board unit, and FIG. 13B shows a drawing viewed from a left side of the matrix-switch-board unit;

FIG. 14A shows a top plan view of the matrix-switch-board unit, and FIG. 14B shows a drawing viewed from a left side of the matrix-switch-board unit;

FIG. 19A and FIG. 19B show a configuration example of a wiring pattern of the matrix switch board of the automatic distribution equipment according to the present invention, FIG. 19A shows a top plan view of the wiring pattern, and FIG. 19B shows a cross-sectional view of the wiring pattern;

DETAILED DESCRIPTION OF THE PREFERRED EMBODIMENTS

In the following, descriptions will be given of automatic distribution equipment and a connection-pin inserting-and-extracting apparatus having a connection-pin holding device, in that order.

Figure 1:
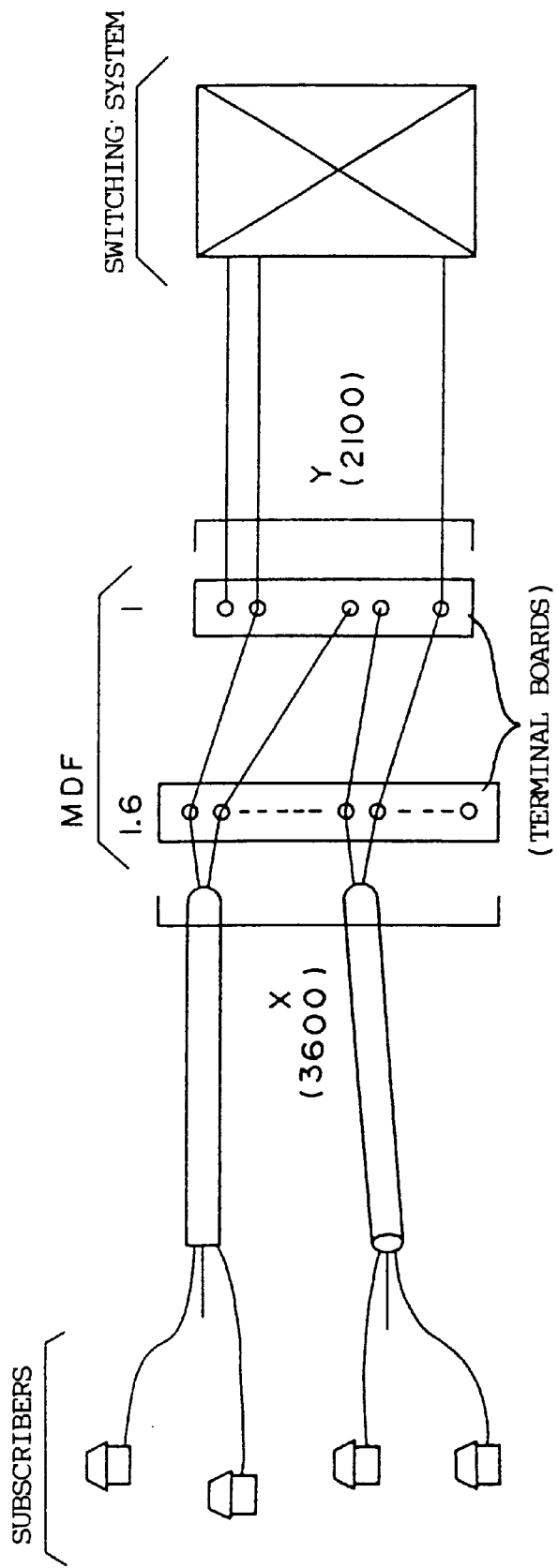
FIG. 1 shows an illustration for explaining a typical function of a main distributing frame (MDF)
Figure 2:
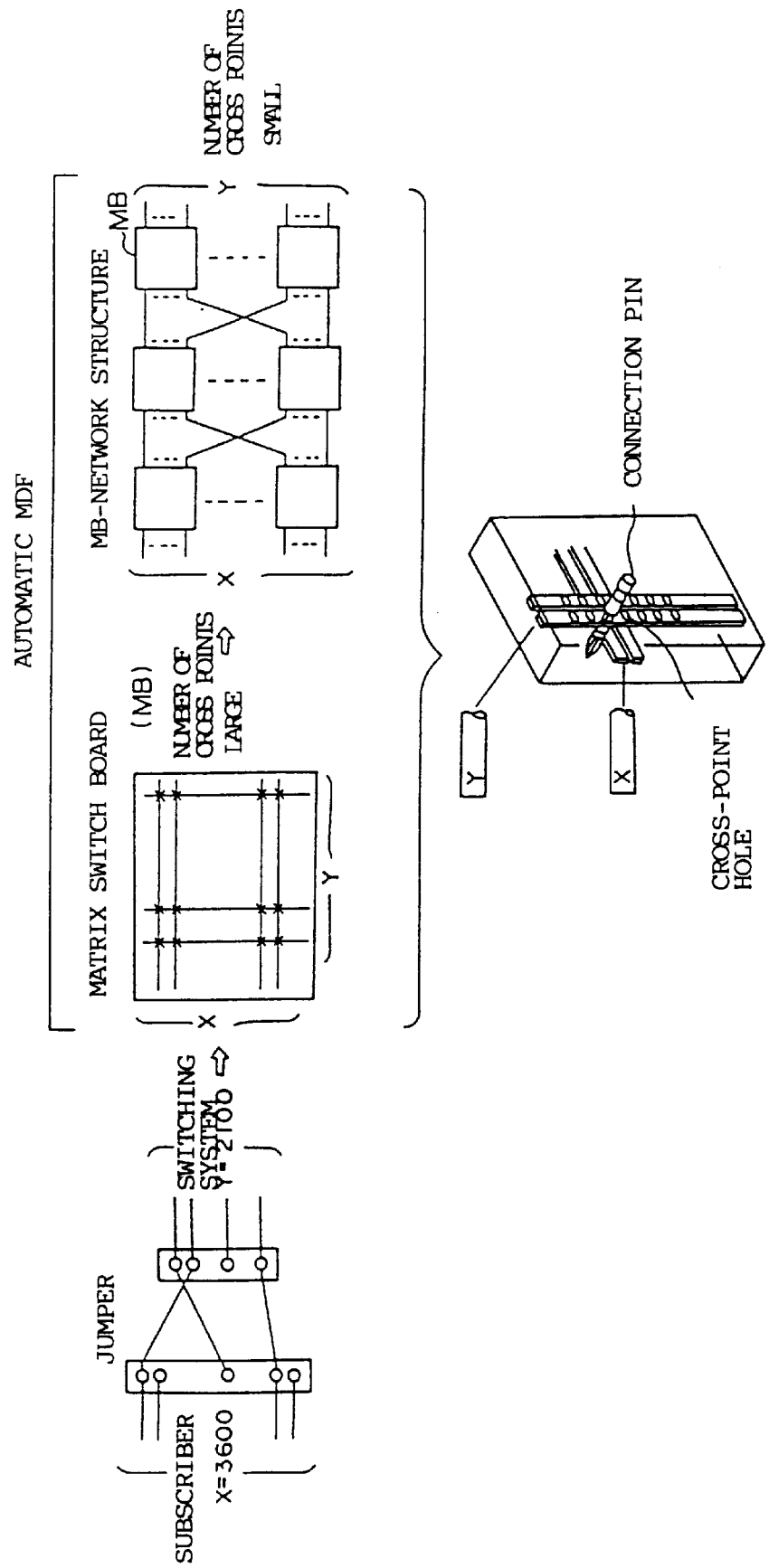
FIG. 2 shows a principle of a first prior-art automatic MDF.
Figure 3C:
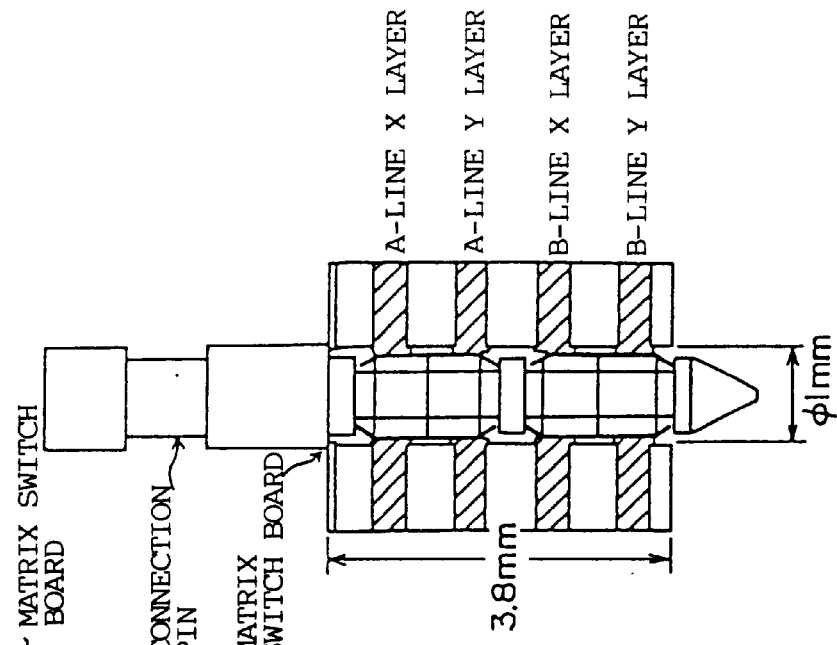
FIG. 3A to FIG. 3C show configurations of prior-art matrix switch board and connection pin used in the first prior-art automatic MDF.
Figure 3A:
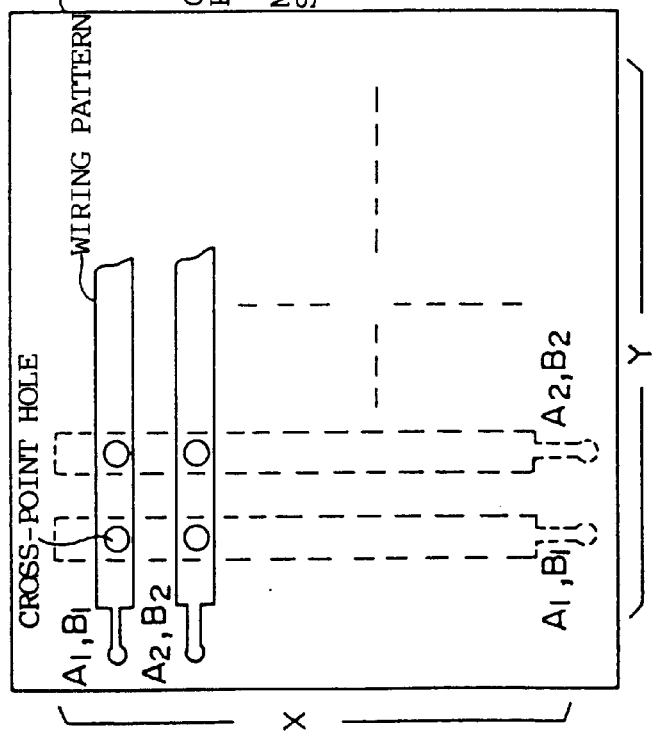
Figure 3B:
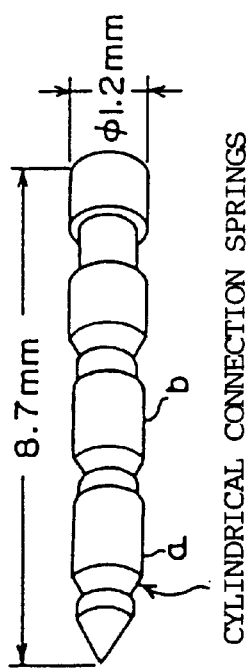
Figure 4:
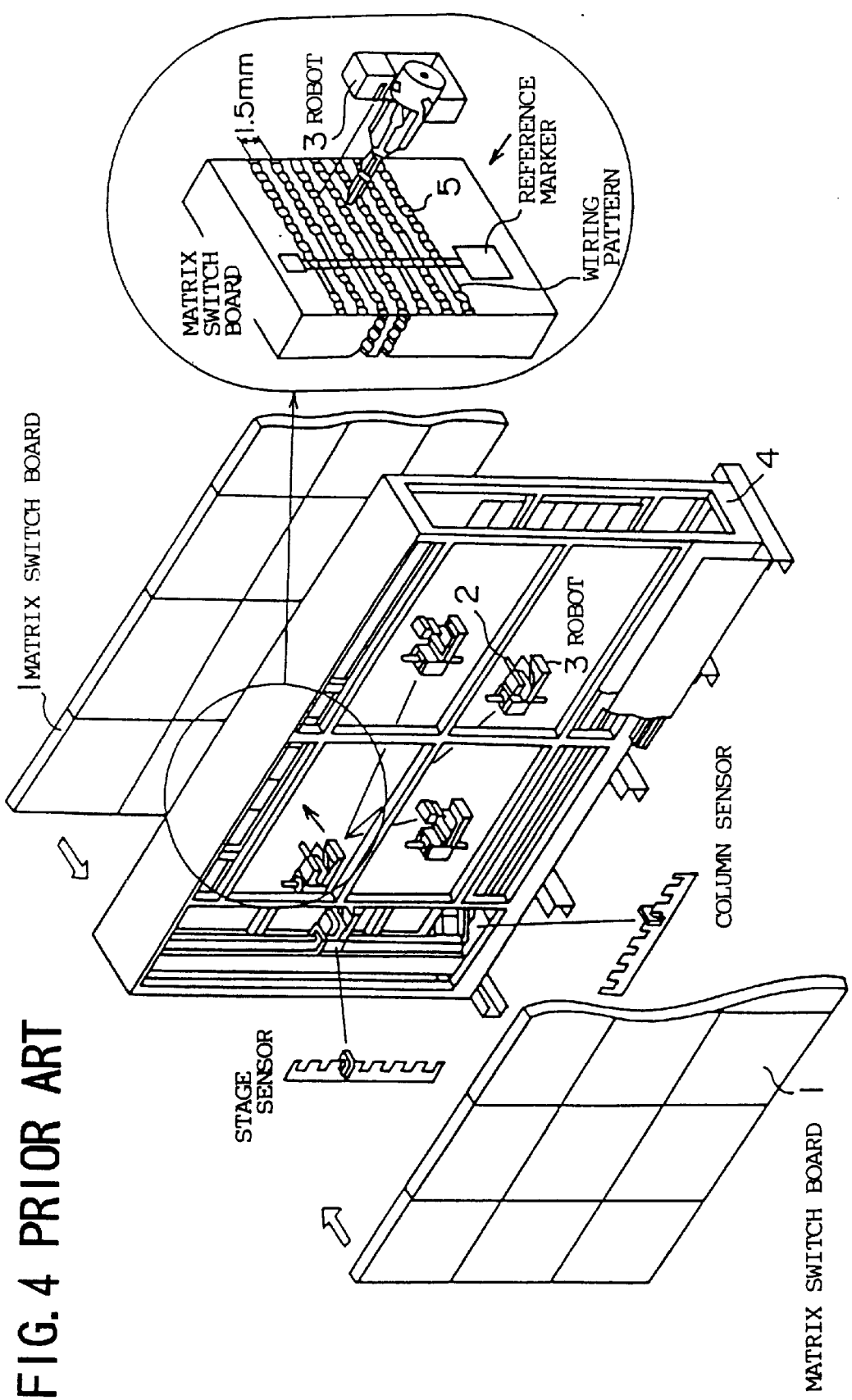
FIG. 4 shows a configuration of the first prior-art automatic MDF.
Figure 5:
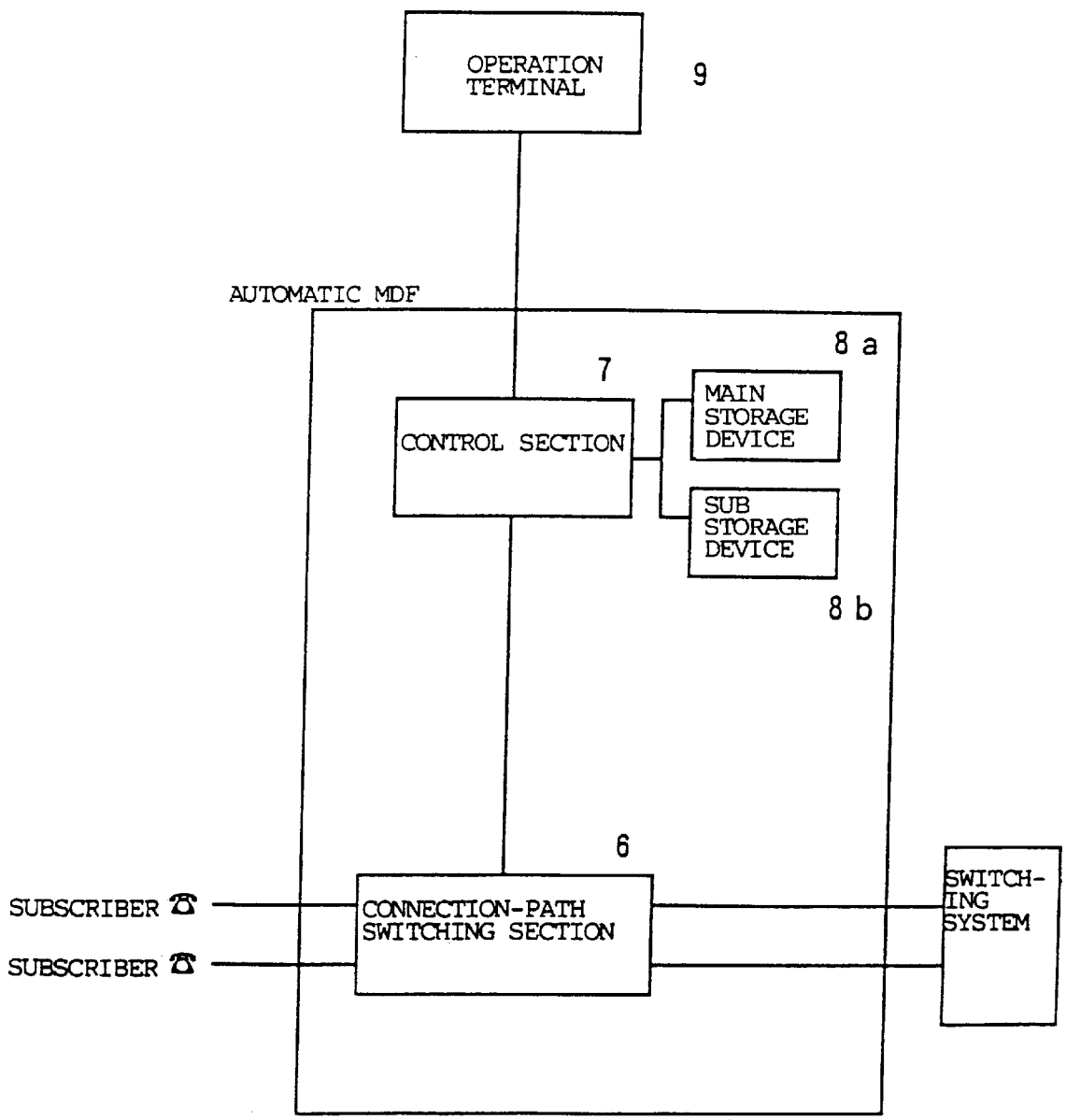
FIG. 5 shows a block diagram of the first prior-art automatic MDF shown in FIG. 4.
Figure 6:
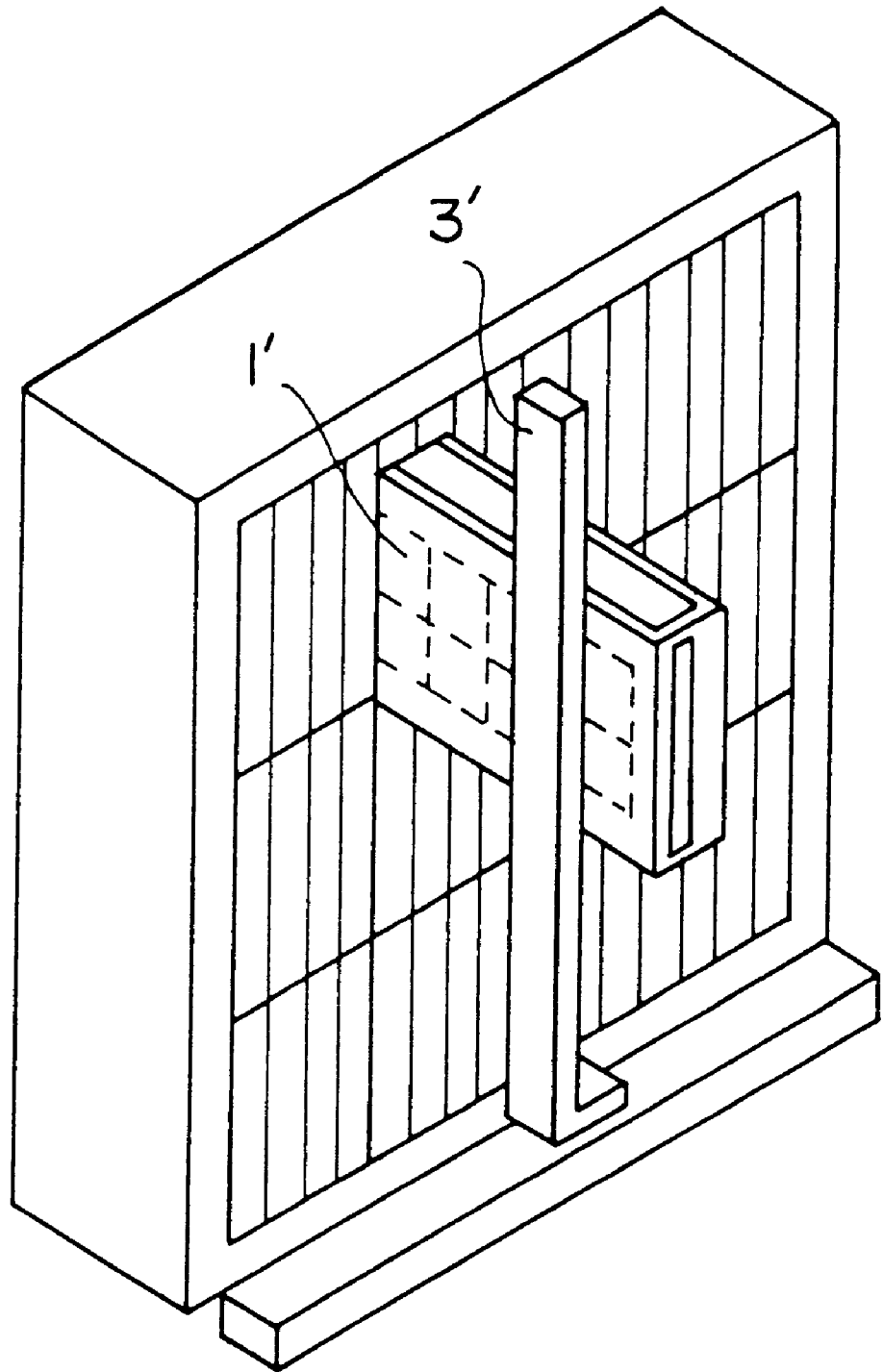
FIG. 6 shows a perspective view of a second prior-art automatic MDF.
Figure 7A:
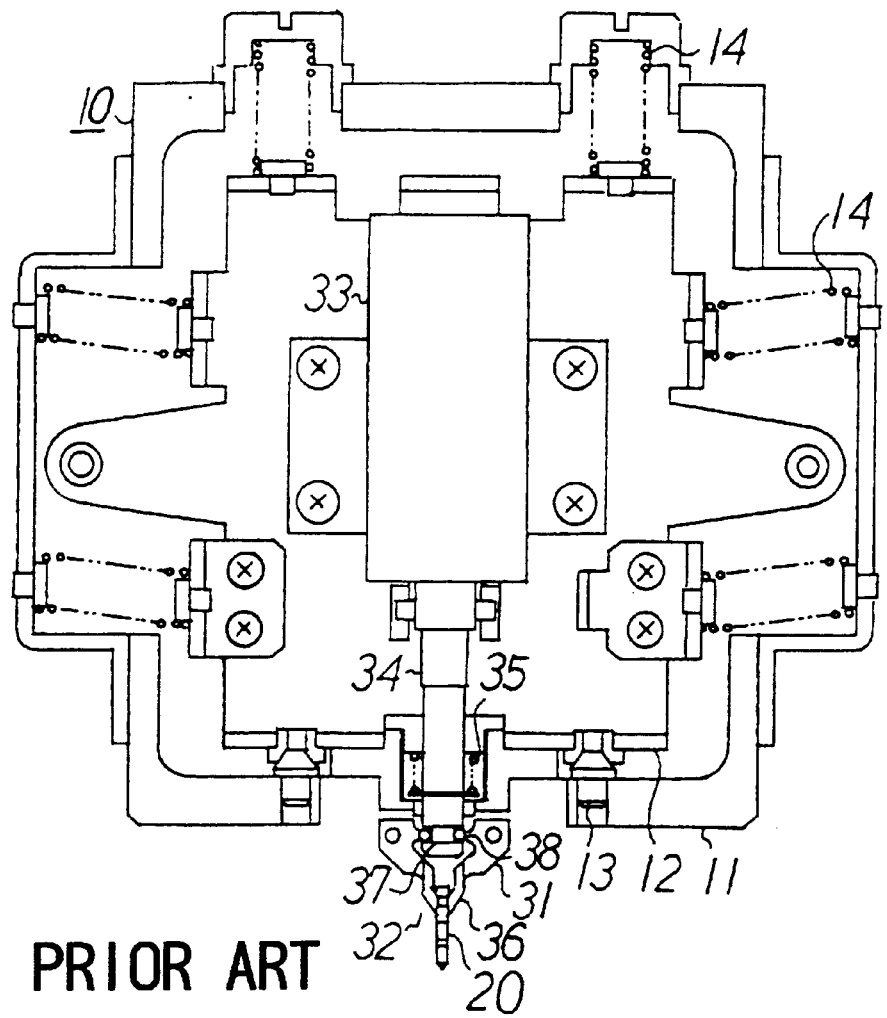
FIG. 7A shows a cross-sectional view of a prior-art connection-pin holding device.
Figure 7B:
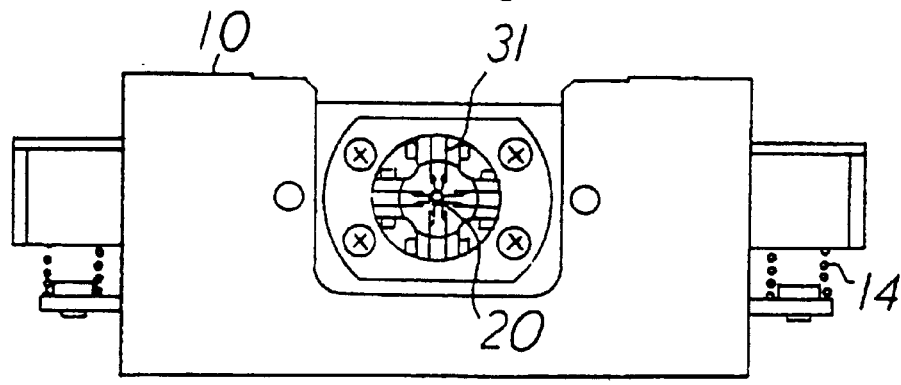
FIG. 7B shows a bottom view of the prior-art connection-pin holding device.
Figure 8:
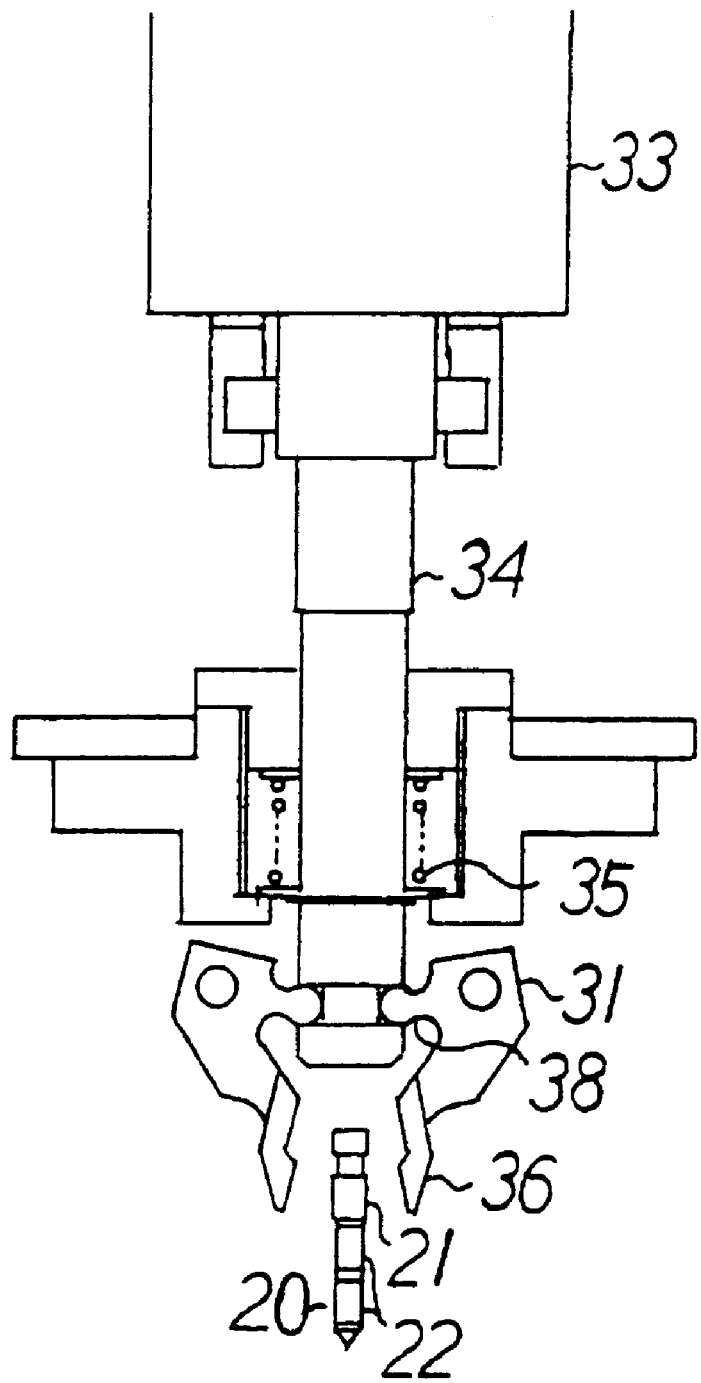
FIG. 8 shows an expanded illustration of a part of the prior-art connection-pin holding device shown in FIG. 7A.
Figure 9:
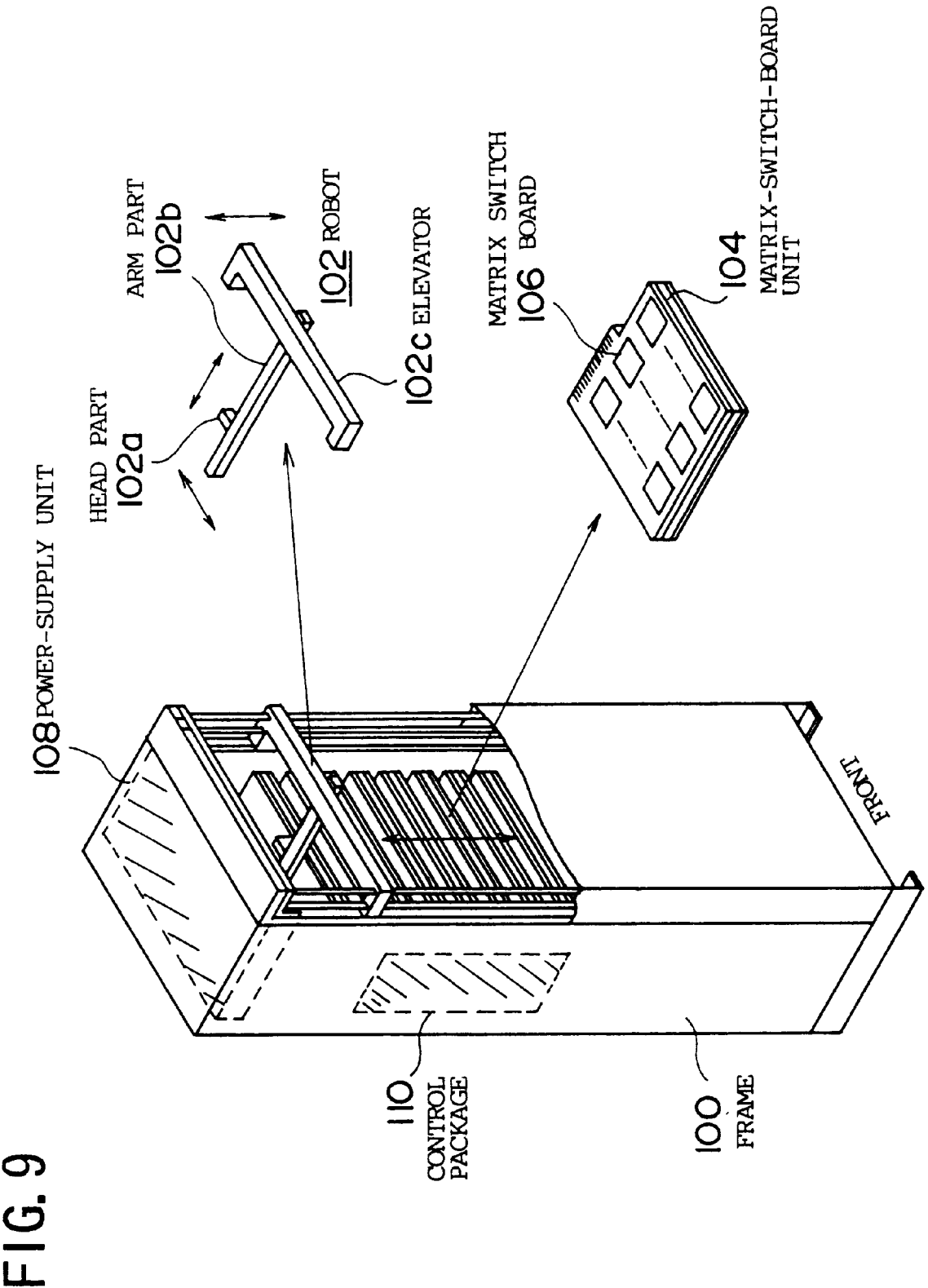
FIG. 9 shows a perspective view of an embodiment of automatic distribution equipment according to the present invention.

First, a description will be given of an embodiment of automatic distribution equipment according to the present invention, by referring to FIG. 9. FIG. 9 shows a perspective view of the embodiment of the automatic distribution equipment according to the present invention.

In the automatic distribution equipment shown in FIG. 9, in a frame 100, a plurality of matrix-switch-board units 104 are arranged so as to be stacked perpendicularly. Each matrix-switch-board unit 104 further includes a plurality of matrix switch boards 106. Each matrix-switch-board unit 104 is connected with a back board (not shown) of the frame 100 through a short wire (not shown).

In each matrix switch board 106, as shown in FIG. 19A, a wire pattern A and a wire pattern B are alternatively arranged as a wiring-pattern array. On opposite sides of the matrix switch board 106, the wiring-pattern arrays are respectively formed so as to electrically be isolated from each other and to cross each other at a right angle. At cross points of the wiring-pattern arrays in both sides, through holes (cross-point holes) are formed. When a connection pin is inserted into a selected through hole, the wiring patterns of the arrays formed on opposite sides of the board crossing at the associated cross point are connected to each other. The two wiring-pattern arrays are respectively connected to a subscriber-side line and a switching-system-side line.

Therefore, by inserting the connection pin into a designated through hole, one of the subscriber-side lines may be connected to one of the switching-system-side lines.

In this equipment, a robot 102 is further provided in a side face of the frame 100. The robot 102 is constructed with a head part 102a for inserting the connection pin into the designated through hole of the matrix-switch-board unit 104, an arm part 102b for supporting the head part 102a, and an elevator part 102c, for supporting the arm part 102b,.

The elevator part 102c, with the head part 102a and the arm part 102b, is movable to a position of a designated matrix-switch-board unit 104 in upward and downward directions. The head part 102a is slidable in forward and backward directions along the arm part 102b, and the arm part 102b is slidable in right and left directions along a longitudinal direction of the elevator part 102c. Therefore, the head part 102a can move to a space between the matrix-switch-board units 104, and can dimensionally move over the matrix-switch-board unit 104.

Each matrix-switch-board unit 104 is installed in the frame 100 along two sides (a back side and a right side) of the four narrow sides of the unit 104. Therefore, by moving the arm part 102b of the robot 102 to a left side of the unit 104, which is not used for the installation in the frame 100, the elevator part 102c can smoothly move the head part 102a and the arm part 102b in a vertical direction.

With respect to an operation of the robot 102, after the elevator part 102c with the head part 102a and the arm part 102b moves to the position of the designated matrix-switch-board unit 104, the arm part 102b and the head part 102a slide over the matrix-switch-board unit 104, and a designated through hole is searched for and detected. After that, the connection pin held in the head part 102a is inserted into the designated through hole to connect designated lines. Therefore, without extracting the matrix-switch-board unit 104 from the frame 100, the robot 102 may insert the connection pin into the designated through hole.

As discussed above, in the automatic distribution equipment according to the present invention, so that the robot can move between the matrix-switch-board units, a plurality of matrix-switch-board units are three-dimensionally arranged.

Therefore, in this automatic distribution equipment, a large number of matrix switch boards may efficiently be assembled. Also, since a moving area of the robot may be narrow, the robot may be controlled with high speed and high efficiency. As a result, a cost of the robot may be reduced.

Further, when the robot inserts the connection pin into the designated through hole, it is unnecessary to extract the matrix-switch-board unit from the frame. Therefore, each matrix-switch-board unit may be connected with the frame through a short cable. Also, a complex extracting mechanism of the matrix-switch-board unit is unnecessary.

Furthermore, since the matrix-switch-board unit does not need to be extracted from the frame, when the designated through hole is positioned adjacent to the robot, line-connecting and line-disconnecting processes may be carried out in a short time.

In the above-discussed automatic distribution equipment, a control package 110 for controlling the robot 102 is provided in an inside wall of the frame 100, and a power-supply unit 108 for operating the robot 102 and the control package 110 is provided higher in the frame 100. Therefore, a mounting space in the frame 100 may efficiently be used, and, thus, this automatic distribution equipment may be miniaturized as compared to equipment having the control unit and the power supply unit externally located.

Figure 10:
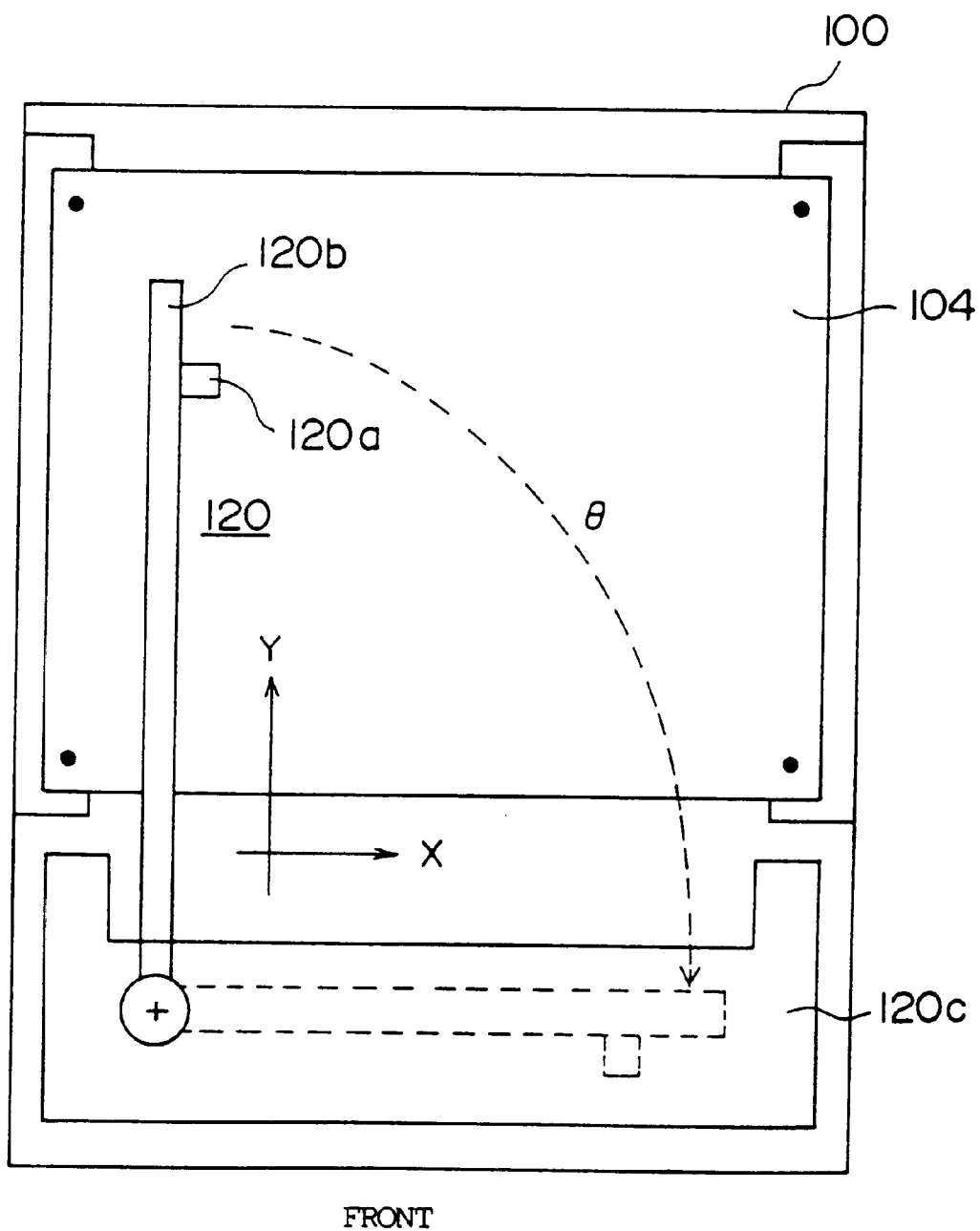
FIG. 10 shows a configuration example of a robot of the automatic distribution equipment according to the present invention.

FIG. 10 shows another configuration example of the robot of the automatic distribution equipment according to the present invention. A robot 120 of the automatic distribution equipment shown in FIG. 10 has substantially the same configuration as that of the robot 102 shown in FIG. 9. The robot 120 is constructed with a head part 120a for inserting a connection pin into a designated through hole of the matrix-switch-board unit 104, an arm part 120b for supporting the head part 120a, and an elevator part 120c for supporting the arm part 120b.

The elevator part 120c, with the head part 120a and the arm part 120b, is movable to the position of the designated matrix-switch-board unit 104 in the upward and downward directions. The head part 120a is slidable in the forward and backward directions along the arm part 120b, and the arm part 120b is slidable in the right and left directions along a longitudinal direction of the elevator part 120c.

Different from the robot 102, the arm part 120b of the robot 120 is rotatable, about a rotation point with the elevator part 120c, toward the elevator part 120c. Namely, the head part 120a and the arm part 120b can be accommodated in a front space of the frame 100. Further, the head part 120a and the arm part 120b accommodated in the front space are vertically movable with the elevator part 120c in a front side (i.e. portion) of the frame 100. After the elevator part 102c arrives at the designated matrix-switch-board unit 104, the robot 120 opens the arm part 102b (i.e., by rotation) and moves the head part 120a to the position of the designated through hole.

In this way, in this embodiment, only in the front-side space of the frame 100, the robot 120 may be controlled to move vertically. Therefore, the matrix-switch-board unit 104 may positively be fixed to the frame 100 along three side parts (back, left and right side parts) of the unit 104. FIG. 10 shows an example in which the matrix-switch-board unit 104 is fixed to the frame 100 along four points in the right and left sides.

Figure 11:
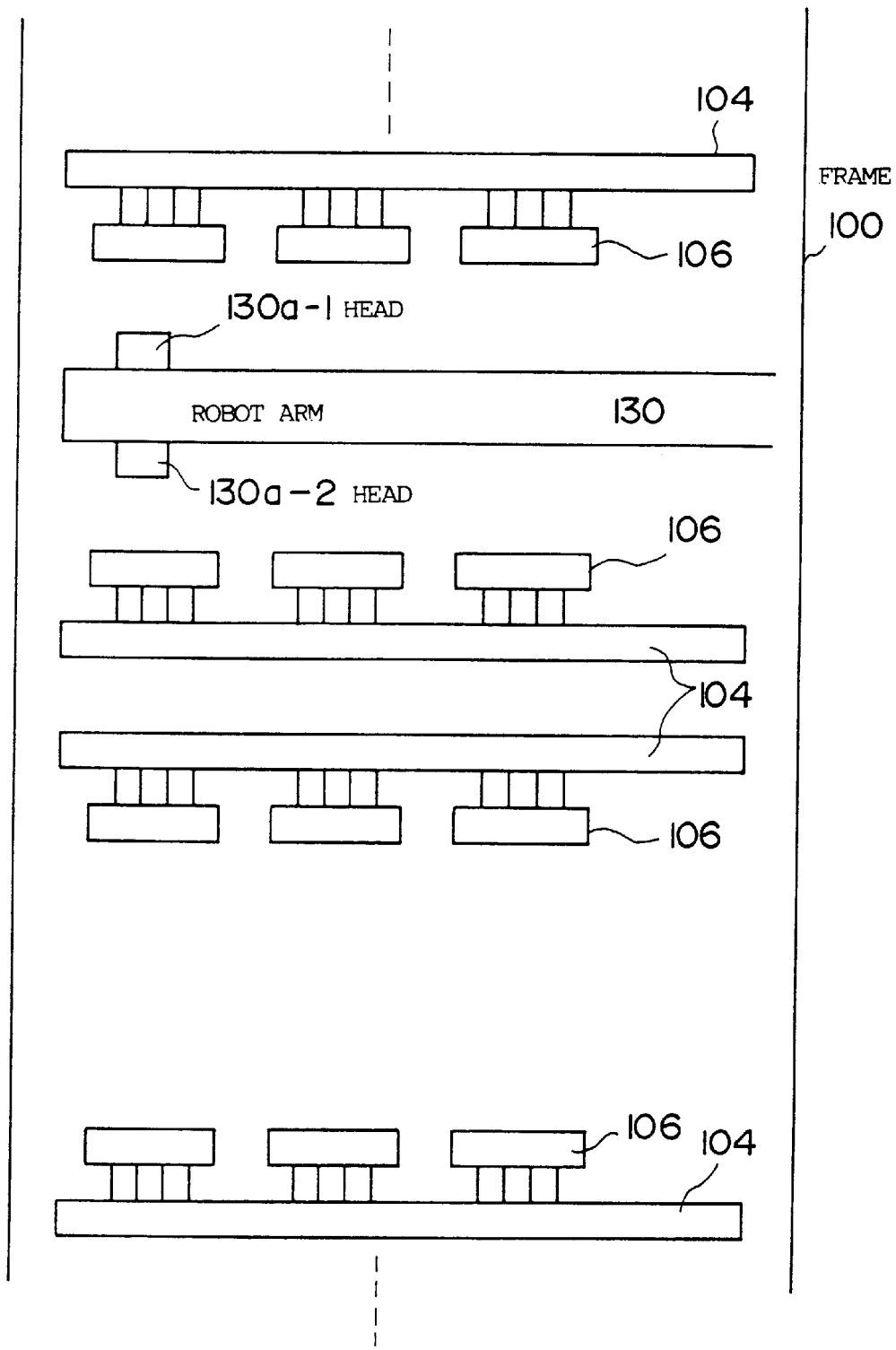
FIG. 11 shows a configuration example of a head part of the robot of the automatic distribution equipment according to the present invention.
Figure 12:
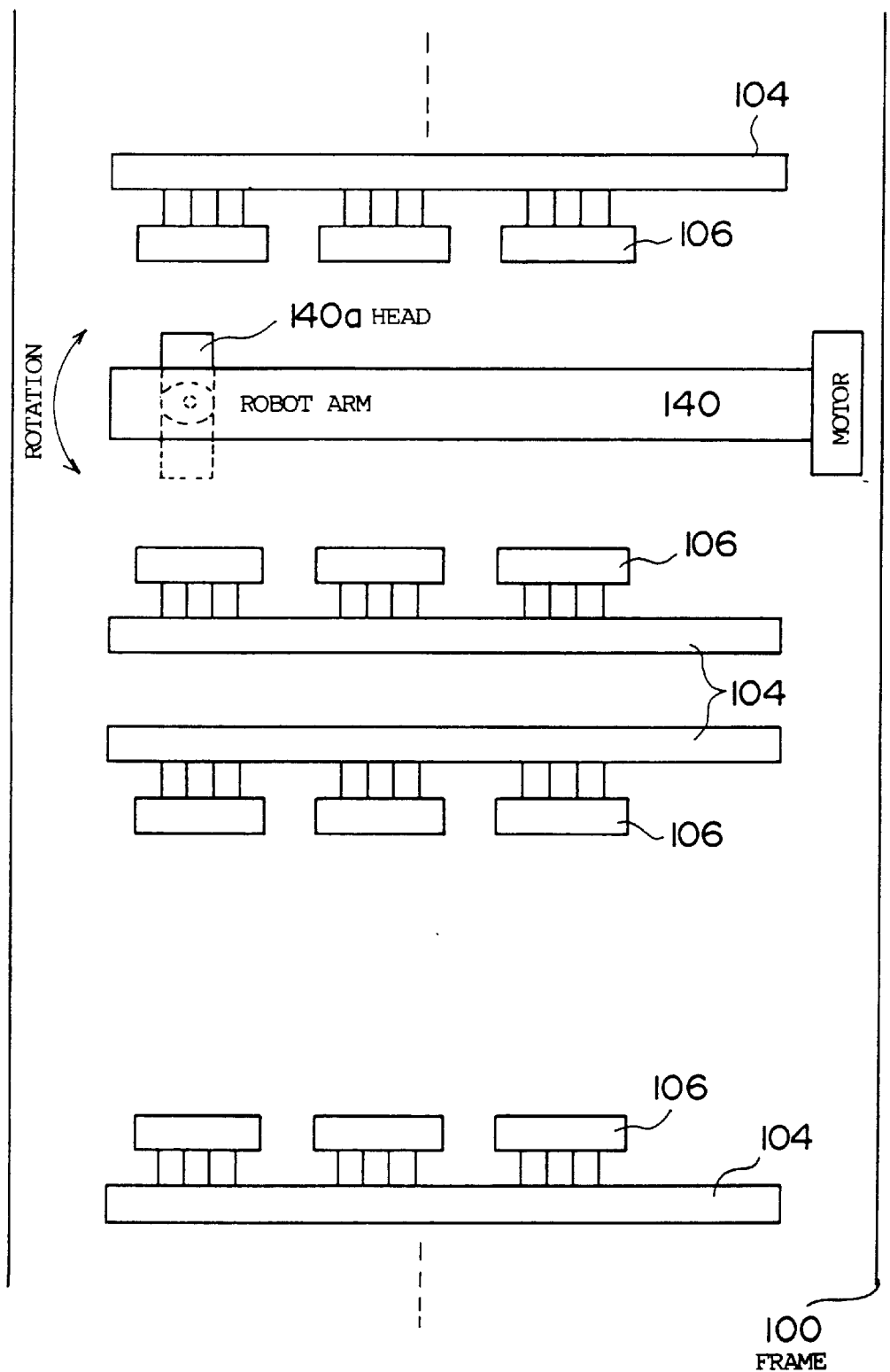
FIG. 12 shows another configuration example of the head part of the robot of the automatic distribution equipment according to the present invention.

FIG. 11 and FIG. 12 show configuration examples of the head part of the robot of the automatic distribution equipment according to the present invention. A robot 130 shown in FIG. 11 has two heads 130a-1, 130a-2 which are fixed so as to respectively face in upward and downward directions. A robot 140 shown in FIG. 12 has a rotatable head 140a which is rotatable between the upward and downward directions. The head parts of the robots 130, 140 move between the two successively-stacked matrix-switch-board units 104, and can insert and extract the connection pin in both the upward direction and the downward direction.

When the robots 130, 140 are used, as shown in FIG. 11 and FIG. 12, a plurality of pairs of two matrix-switch-board units 104 facing each other are stacked and arranged. In this case, between the two matrix-switch-board units 104 in each pair, the robot needs to move. However, between the pair of the two matrix-switch-board units 104 and another pair thereof, the robot does not need to move. Therefore, a distance between these pairs of the units 104 may be narrower than that between the two matrix-switch-board units 104 in the pair. Accordingly, the matrix-switch-board units may be mounted in the frame with high density.

Figure 13A:
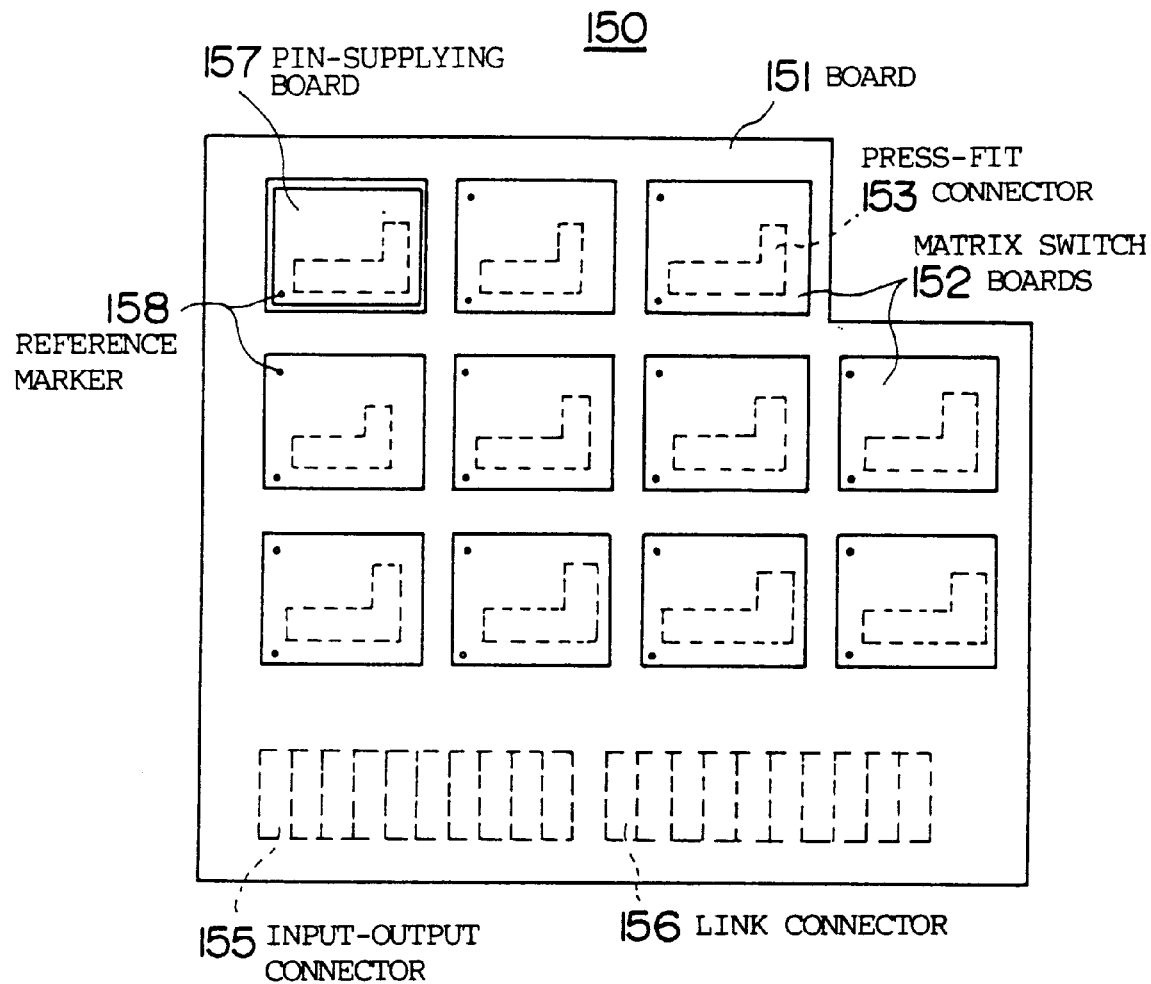
FIG. 13A and FIG. 13B show a configuration example of a matrix-switch-board unit of the automatic distribution equipment according to the present invention.
Figure 13B:
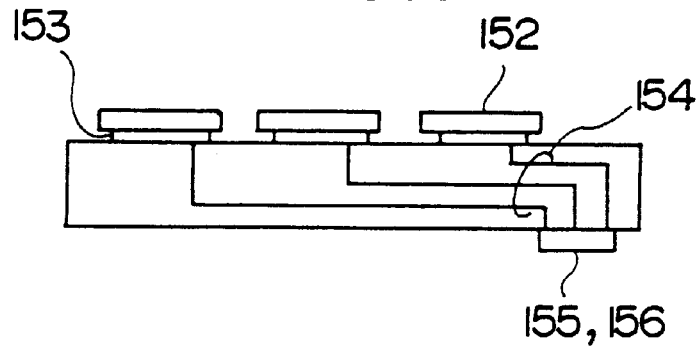
Figure 14A:
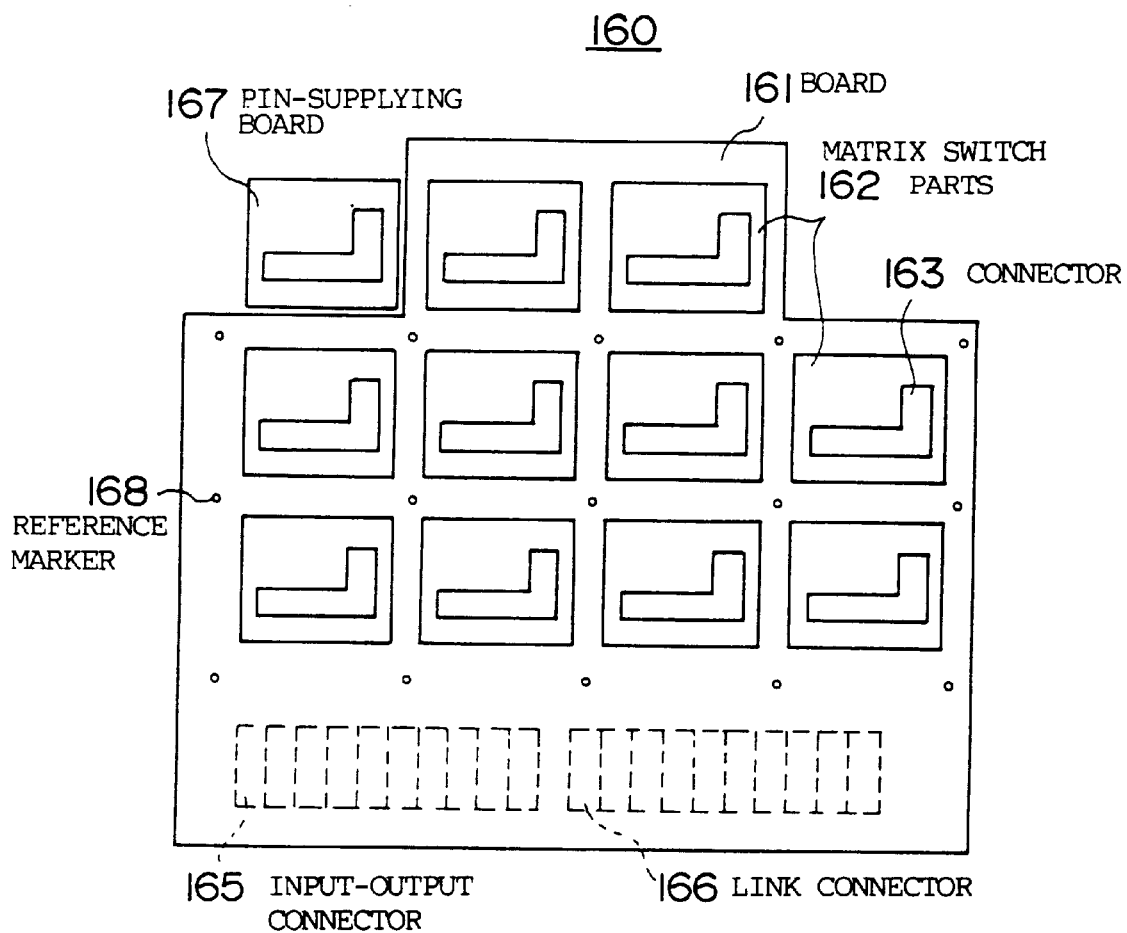
FIG. 14A and FIG. 14B show another configuration example of the matrix-switch-board unit of the automatic distribution equipment according to the present invention.
Figure 14B:
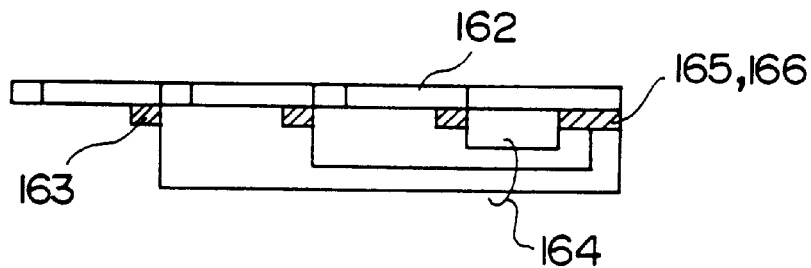

FIG. 13A, FIG. 13B, FIG. 14A and FIG. 14B show configuration examples of the matrix-switch-board unit of the automatic distribution equipment according to the present invention. Each of FIG. 13A and FIG. 14A shows a top plan view of the matrix-switch-board unit, and each of FIG. 13B and FIG. 14B shows a drawing viewed from a left side of the matrix-switch-board unit.

A matrix-switch-board unit 150 shown in FIG. 13A is constructed with a board 151 and a plurality of matrix switch boards 152 mounted on the board 151 through press-fit connectors 153. In each matrix switch board 152, two pairs of the wiring-pattern arrays are formed in opposite sides (top and bottom sides) of the board 151 so as to electrically isolated from each other and to cross each other. Further, at cross points of the wiring-pattern arrays formed in both sides of the board, associated through holes (cross-point holes) are formed. When the connection pin is inserted into the through hole, the wire patterns associated therewith formed in both sides of the board, are connected to each other. The matrix switch board 152 is connected to an input-output connector 155 and a link connector 156 through internal wires 154 formed in the board 151.

In a matrix-switch-board unit 160 shown in FIG. 14A, in a board 161, a plurality of matrix switch parts 162 are dimensionally arranged. Each matrix switch part 162 has substantially the same configuration as that of the matrix switch board 152 shown in FIG. 13A. The matrix switch part 162 is connected with a connector 163 provided in a back-side face of the board 161, and is connected with an input-output connector 165 and a link connector 166 through jumpering wires.

The input-output connectors 155, 165 are used for connecting the matrix switch board 152 and the matrix switch part 162 with external lines. The link connectors 156, 166 are used for connecting the matrix switch board 152 and the matrix switch part 162 with mainly the matrix switch board 152 and the matrix switch part 162 of another matrix-switch-board unit 150, 160.

Figure 15:
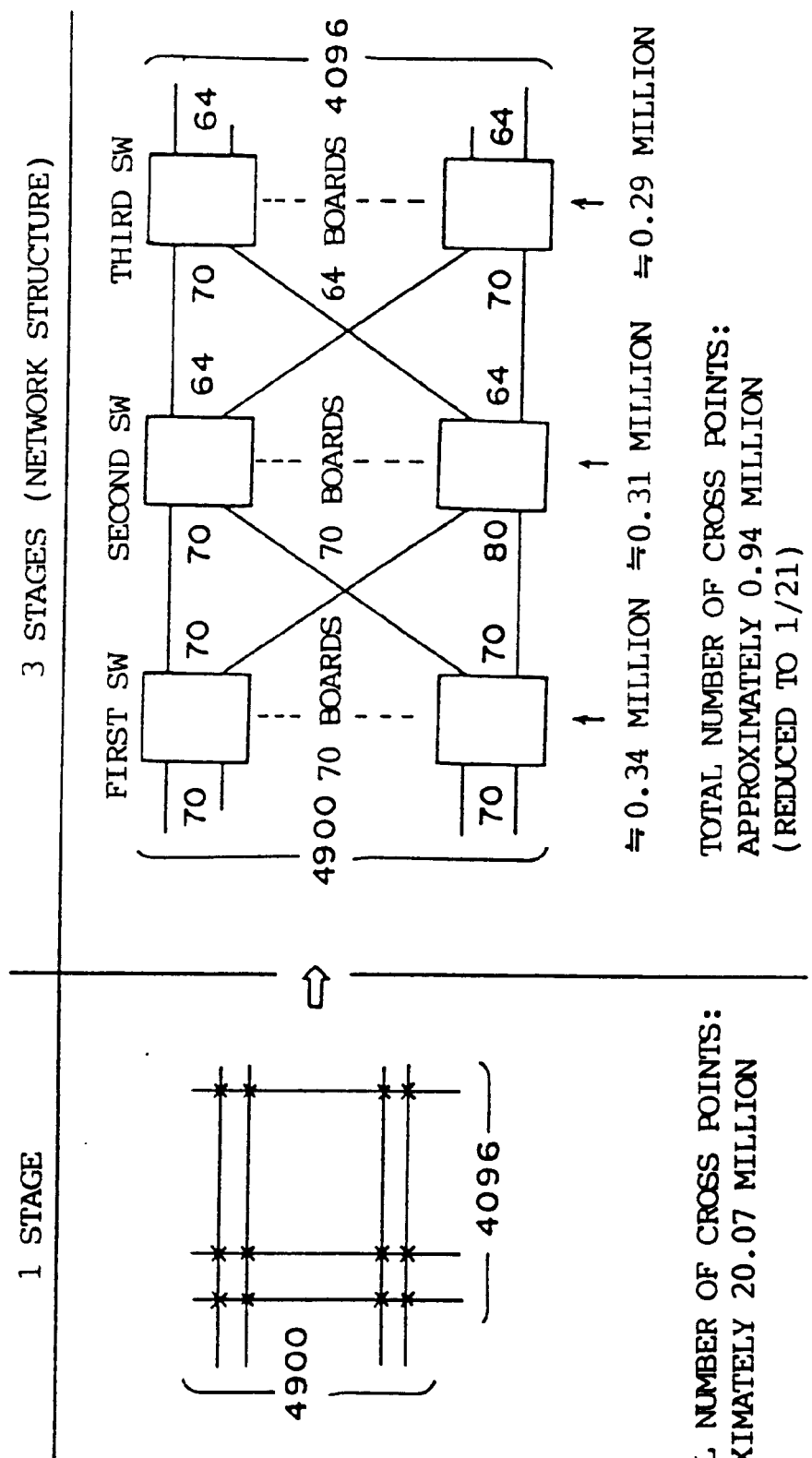
FIG. 15 shows an example of a network configuration of a matrix switch board in the automatic distribution equipment.

FIG. 15 shows an example of a network configuration of the matrix switch board in the automatic distribution equipment. For example, when connections between 4900 terminals on one side and 4096 terminals on another side are carried out using one matrix switch board, approximately 20.07-million cross-point holes are required. However, for example, when this connection network is constituted in three stages by using a plurality of different-sized matrix switch boards ((70×70) boards and (70×64) boards), the number of cross-point holes may be reduced to approximately 0.94 million. The matrix-switch-board units 150, 160 shown in FIG. 13A and FIG. 14A may easily include such different-matrix-size matrix switch board and matrix switch part. Therefore, by using the matrix-switch-board unit according to the present invention, the network structure of the matrix switch board may easily be realized, and in that network structure, a large number of lines with high density may be constructed.

Figure 16:
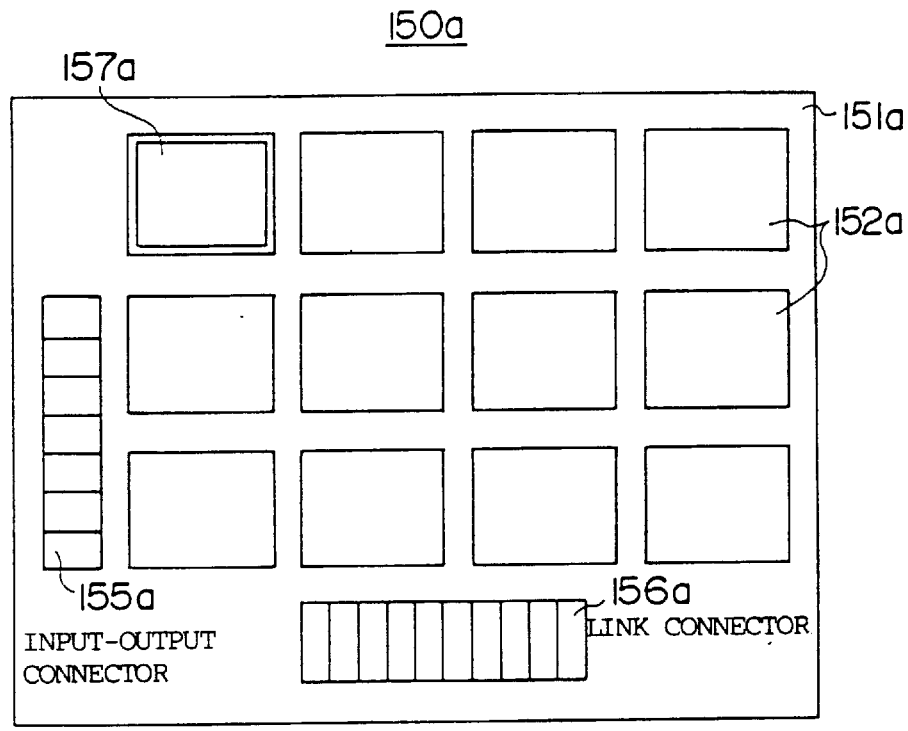
FIG. 16 shows another configuration example of the matrix-switch-board unit of the automatic distribution equipment according to the present invention.
Figure 17:
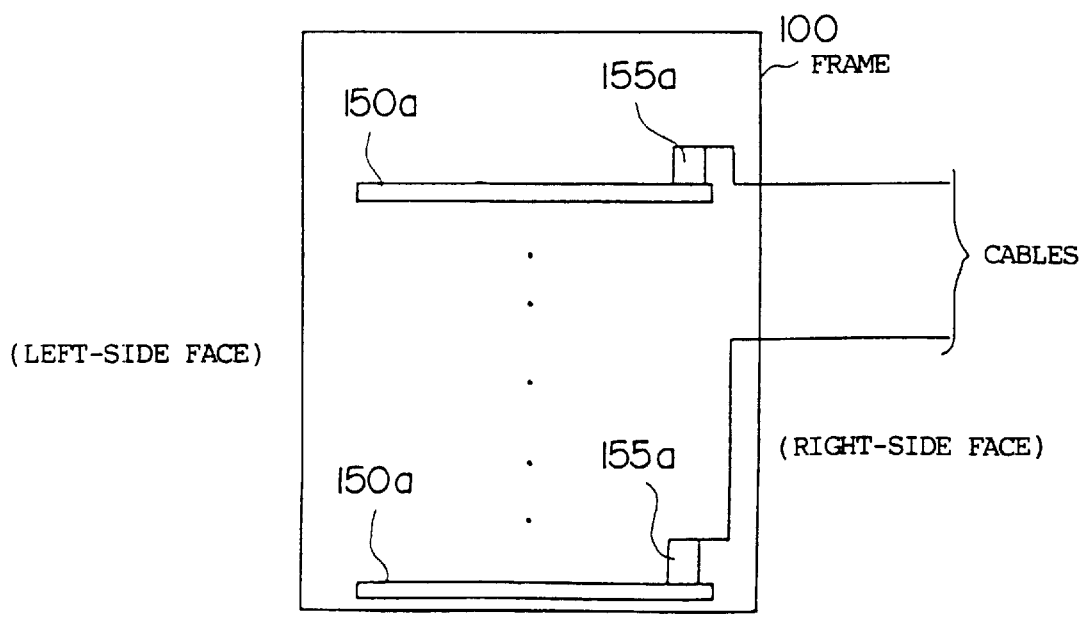
FIG. 17 shows a configuration example of a cable connection of the matrix-switch-board unit shown in FIG. 16.

FIG. 16 shows another configuration example of the matrix-switch-board unit of the automatic distribution equipment according to the present invention. FIG. 17 shows a configuration example of a cable connection of the matrix-switch-board unit shown in FIG. 16. A matrix-switch-board unit 150a has substantially the same configuration as that of the matrix-switch-board unit 150. In the matrix-switch-board unit 150a, an input-output connector 155a is mounted in a side of the matrix-switch-board unit 150a.

FIG. 17 shows a case where the input-output connector 155a of the matrix-switch-board unit 150a is connected with external cables through a side wall of the frame 100. In this way, by providing the input-output connector in the side of the matrix-switch-board unit, the connection between each matrix-switch-board unit and the cables of external equipment may efficiently be carried out.

Further, in the matrix-switch-board units shown in FIG. 13A, FIG. 14A and FIG. 16, in addition to the input-output connector, the link connector is provided for each unit. Therefore, the network structure of the matrix switch board may easily be realized, and in the network structure, a large number of lines with high density may be constructed.

In the matrix-switch-board units 150, 160 shown in FIG. 13A and FIG. 14A, pin-supplying boards 157, 167 for accommodating the connection pins are respectively provided. Each of the pin-supplying boards 157, 167 has substantially the same configuration as that of the matrix switch board. The pin-supplying board 157 may be connected to the board 151 through a connector in the same way as the matrix switch board 152, and the pin-supplying board 167 may be fixed to the board 161 using screws, for example.

Figure 18:
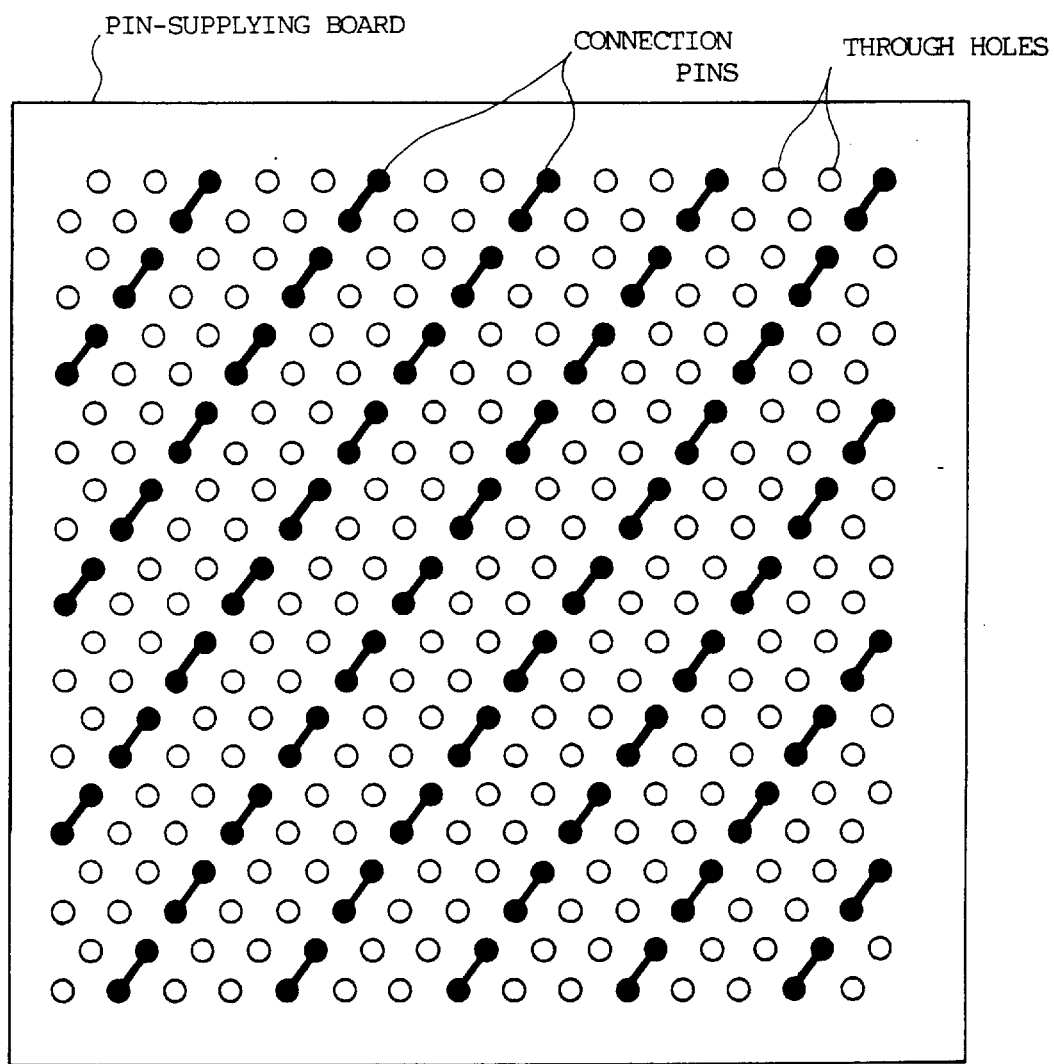
FIG. 18 shows a configuration example of a pin-supplying board.

In the pin-supplying boards 157, 167, a large number of through holes are provided. To prevent degradation of elasticity of the spring of the connection pin, a diameter of the through hole is designed larger than a diameter of the through hole of the matrix switch board. FIG. 18 shows a configuration example of the pin-supplying board. In the drawing, a black part indicates a connection pin which can be simultaneously inserted into two through holes (referred to FIG. 20).

For example, when the automatic distribution equipment is shipped, the connection pins are accommodated in the pin-supplying boards 157, 167 (FIG. 13A). When, for example, the subscriber's address changes, and when it is ordered by an office to change the connection of the subscriber-side path, the robot extracts the connection pin from the pin-supplying boards 157, 167, and inserts the connection pin into the designated through hole in the matrix switch board 152 and the matrix switch part 162. In this way, by providing the pin-supplying board for each matrix-switch-board unit, the robot does not need to go to other matrix-switch-board unit for the connection pin. Therefore, the connection pin may efficiently be supplied to the robot, and, thus, an operation time of the robot may be reduced.

Further, in the matrix-switch-board units 150, 160 shown in FIG. 13A and FIG. 14A, to enable the robot to search for and detect the designated through hole, reference markers 158, 168 are respectively provided. Since the reference markers 158, 168 are formed using the same mask pattern as that of the wiring pattern, a positional relationship between the reference markers 158, 168 and the wiring pattern may precisely be determined. Therefore, after the robot detects the positions of the reference markers 158, 168, the robot can precisely search for and detect the position of the designated through hole.

Figure 20:
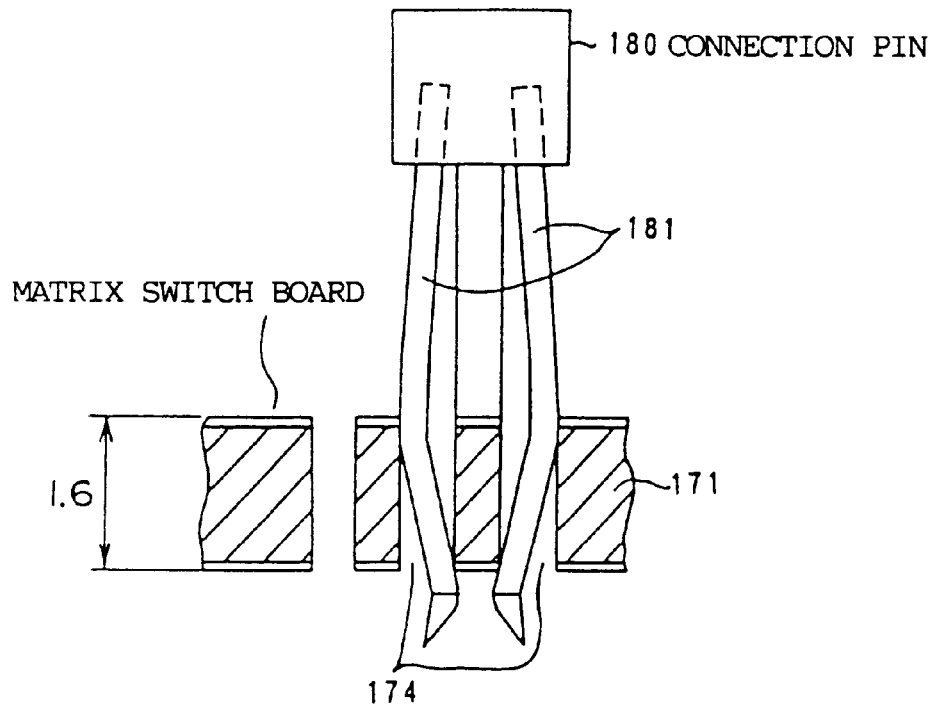
FIG. 20 shows a configuration example of a connection pin according to the present invention.
Figure 21:
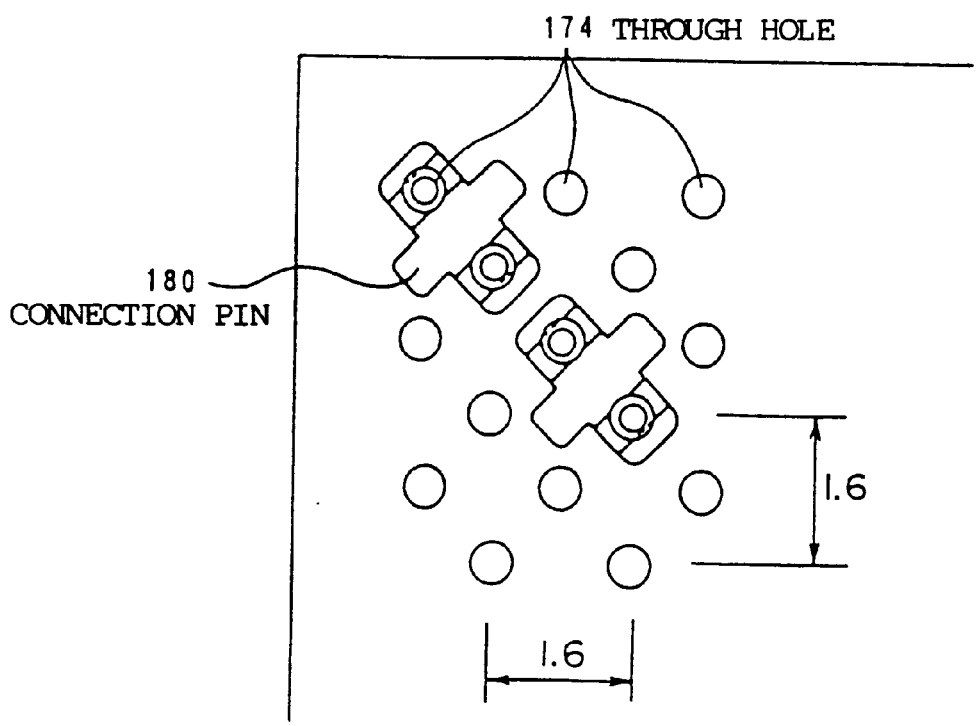
FIG. 21 shows a case where the connection pin shown in FIG. 20 is inserted into the matrix switch board shown in FIG. 19A.

FIG. 19A and FIG. 19B show a configuration example of the wiring pattern of the matrix switch board of the automatic distribution equipment according to the present invention. FIG. 19A shows a top plan view of the wiring pattern, and FIG. 19B shows a cross-sectional view of the wiring pattern. FIG. 20 shows a configuration example of the connection pin according to the present invention. FIG. 21 shows a case where the connection pin shown in FIG. 20 is inserted into the matrix switch board shown in FIG. 19A.

A matrix switch board 170 shown in FIG. 19A is constructed with a two-layer-structure printed board 171. In opposite sides of the printed board 171, wiring patterns 172 and 173 are respectively arranged so as to cross each other at a right angle. For example, the wiring pattern 172 formed in the front surface of the printed board 171 may be used for the subscriber-side wire, and the wiring pattern 172 formed in the back of the printed board 171 may be used for the switching-system-side wire. In this case, in the wiring pattern 172 formed in the front surface, a pair of adjacent wiring patterns forms two wires of A line and B line for one subscriber. Therefore, the wiring patterns 172 in the front surface are arranged so that the A and B lines are alternatively repeated.

On the other hand, in the wiring pattern 173 formed in the back, a pair of adjacent wiring patterns forms two wires of A' line and B' line for the switching system. Therefore, the wiring patterns 173 in the back are arranged so that the A' and B' lines are alternately repeated.

In the above example, so that a connection between the A line in the front surface and the A' line in the back and a connection between the B line in the front surface and the B' line in the back are respectively established, through holes 174 are formed at the corresponding cross points. By inserting the connection pin into the through hole, the A line in the front surface may selectively be connected with the A' line in the back and the B line in the front surface may selectively be connected with the B' line in the back.

Therefore, the through holes 174 can be formed in every other cross point in a direction of the wiring pattern 172 for the subscriber. Also, the through holes 174 can be formed in every other cross point in a direction of the wiring pattern 173 for the switching system. In this way, the through holes 174 are not formed in every cross point, or in adjoining cross points. Therefore, the through holes 174 may be formed with high density. Further, since the above-discussed matrix switch board is fabricated using the two-layer printed board, cost reduction of the through hole is expected.

Furthermore, as shown in FIG. 20, a connection pin 180 used in the automatic distribution equipment according to the present invention has two connecting members 181 (metallic springs) which are electrically isolated from each other. When the connection pin 180 is inserted into the two through holes 174 for the A and B lines of the matrix switch board 170 as shown in FIG. 21, the connection between the A line in the front surface and the A' line in the back and the connection between the B line in the front surface and the B' line in the back can simultaneously be established.

As discussed above, even if the less-expensive two-layer-structure board is applied to the matrix switch board, if the matrix switch board in which both A and B lines are arranged in one side of the board, and the connection pin having the two connection members are used, two pairs of paths between the wiring patterns for a designated line may simultaneously be connected and disconnected. Therefore, without degrading a highly efficient connecting operation in the board, the cost of the board may be reduced.

Figure 22:
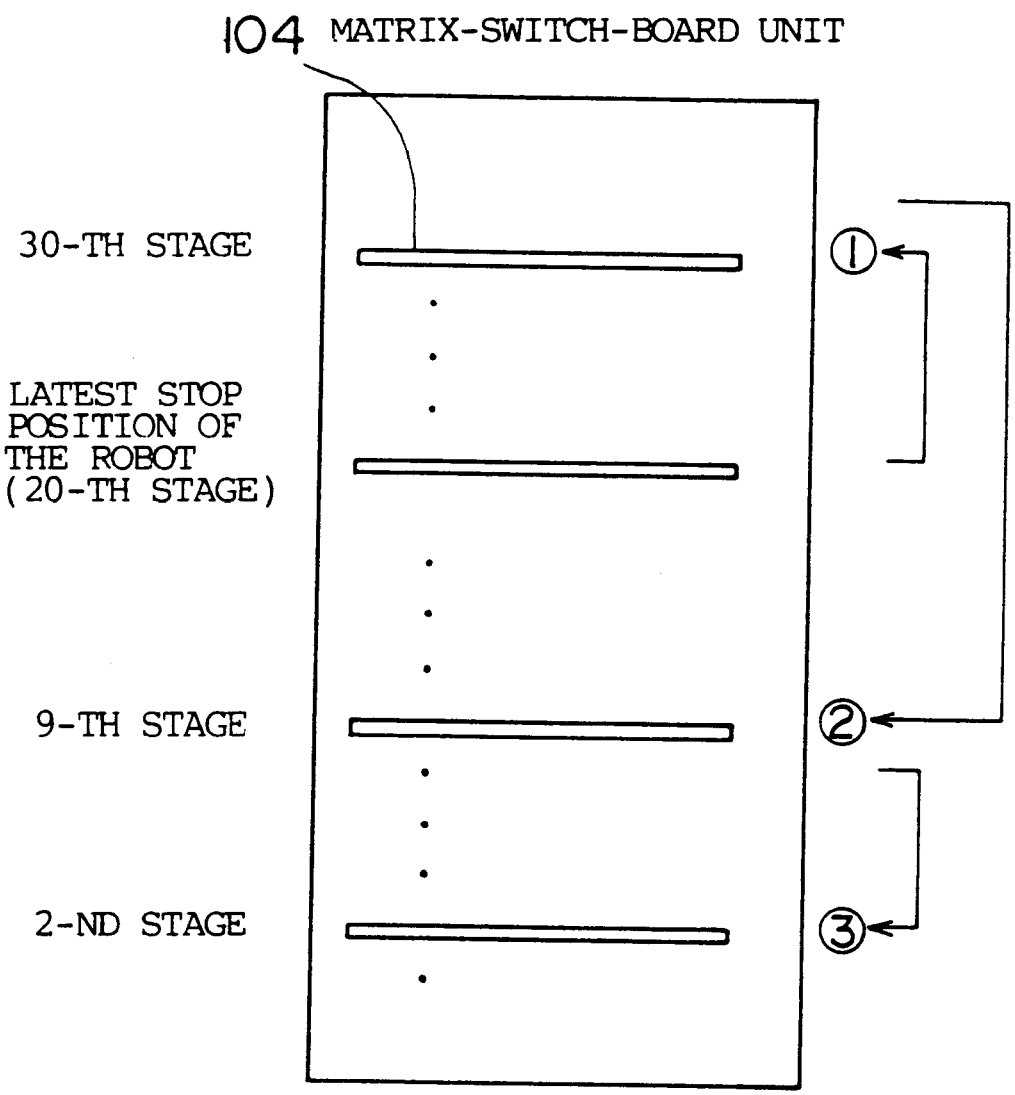
FIG. 22 shows an illustration for explaining a control operation of the robot in the automatic distribution equipment according to the present invention.

FIG. 22 shows an illustration for explaining a control operation of the robot in the automatic distribution equipment according to the present invention. In the following, an operation example of the robot will be discussed. First, from an operational terminal (not shown) provided outside the automatic distribution equipment, a command to establish a plurality of connections between the lines is transmitted to the automatic distribution equipment. At this time, in the operational terminal, information of the lines to be connected is transferred to information of the through holes to be connected, and the information of the through holes is transmitted to the automatic distribution equipment.

In the control unit of the automatic distribution equipment, a present position of the robot is previously confirmed (20-th stage in FIG. 22). When the information of the through holes to be connected is received, an inserting and extracting operation of the connection pins is carried out from the through hole nearest the present position of the robot. In the example shown in FIG. 22, first, the inserting and extracting operation is processed for a 30-th matrix-switch-board unit, next is for a 9-th matrix-switch-board unit, and next is for a 2nd matrix-switch-board unit. When the operation for all matrix-switch-board units is finished, the robot stops at the position of the latest matrix-switch-board unit.

After the robot arrives at the designated matrix-switch-board unit, the robot detects the reference marker on the matrix-switch-board unit, and determines a precise position of the through hole to be connected. Then, the robot moves to the through hole to be connected, and inserts the connection pin into the through hole.

In a prior-art control method of the robot, every time an individual inserting and extracting operation is finished, the robot returns to a predetermined position. On the contrary, in the control method of the robot according to the present invention, the robot is controlled to stop at the current position where the inserting and extracting operation is finished. Further, thereof when the current robot next starts to operate, the operation is carried out beginning at the unit or stage nearest the robot. In the above-discussed robot control, a time for the inserting and extracting operation of the connection pin may be reduced.

The above-discussed robot control may be provided in the control package 110 mounted in the frame 100 shown in FIG. 9.

Figure 23A:
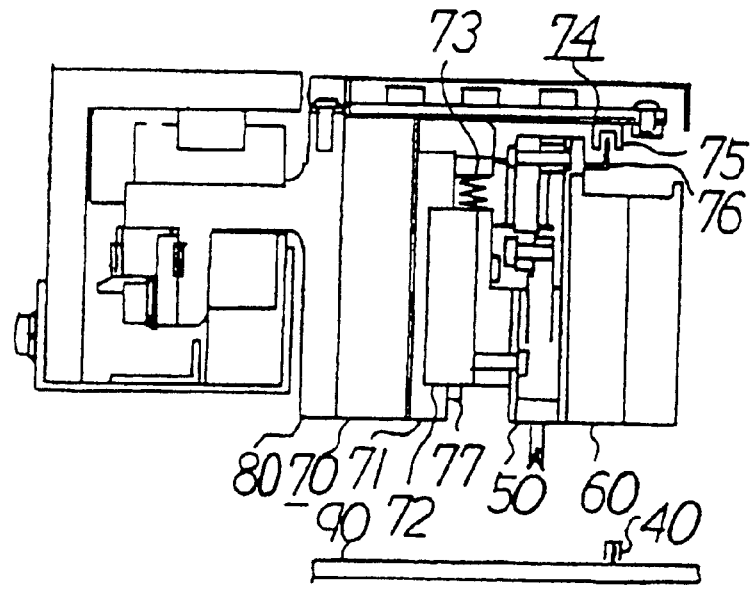
FIG. 23A shows a cross-sectional view of a connection-pin inserting-and-extracting apparatus according to the present invention.
Figure 23B:
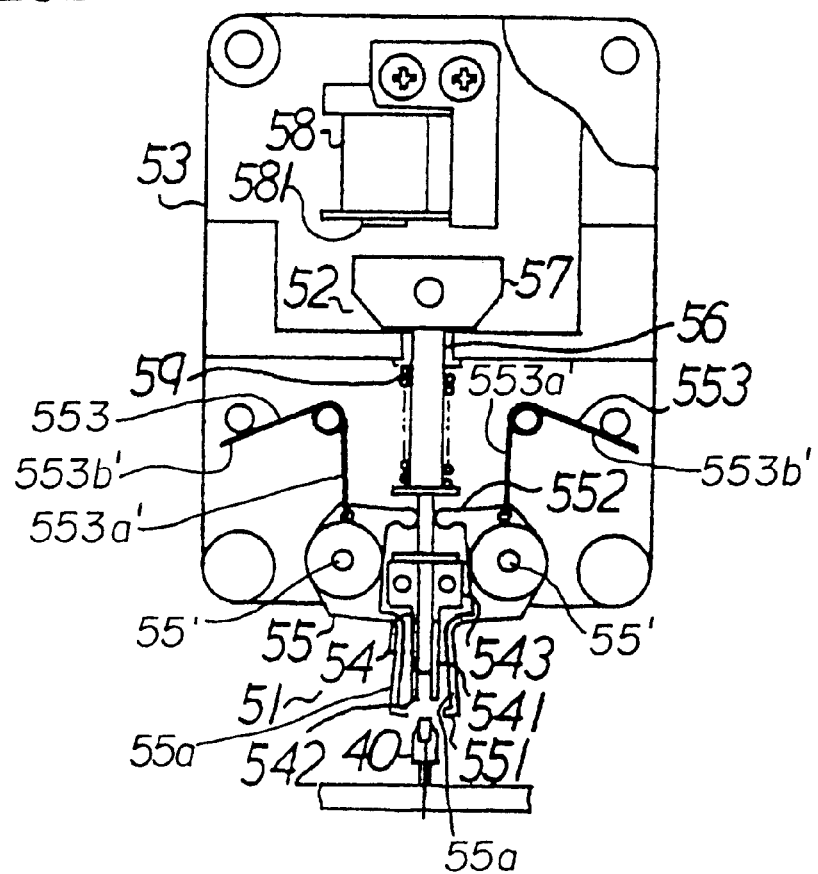
FIG. 23B shows a cross-sectional view of a connection-pin holding device provided in the connection-pin inserting-and-extracting apparatus shown in FIG. 23A.
Figure 24:
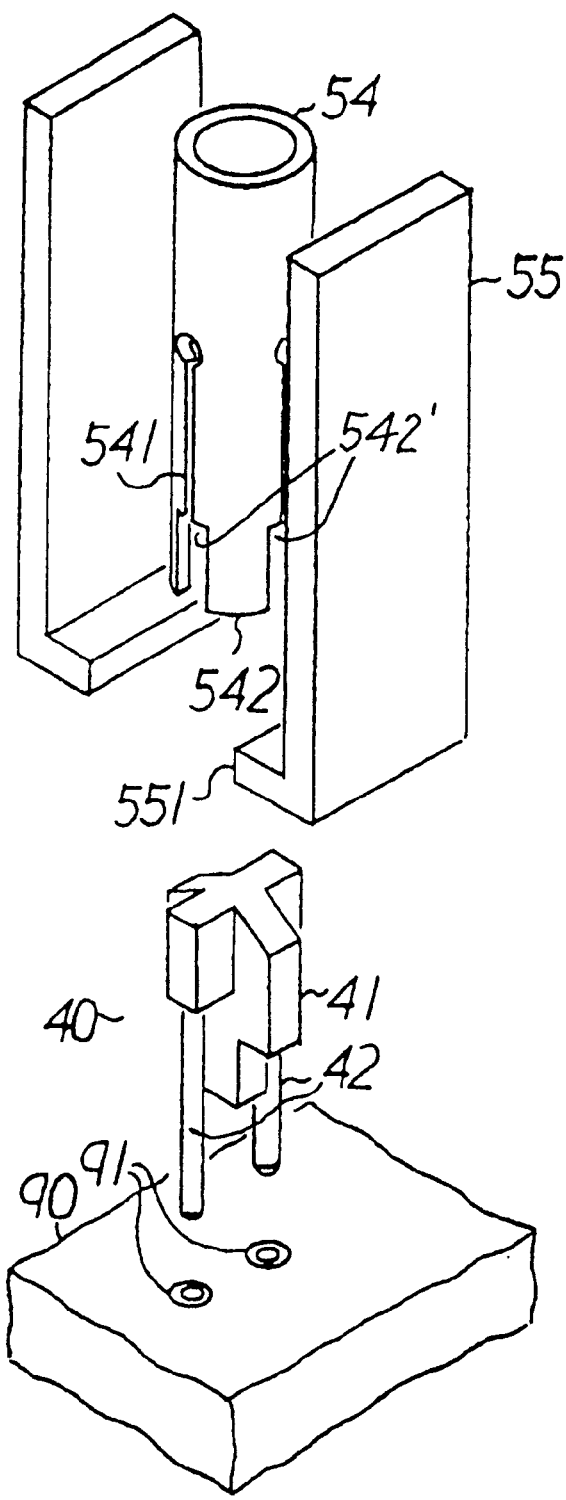
FIG. 24 shows an illustration for explaining a connection-pin holding mechanism.
Figure 25:
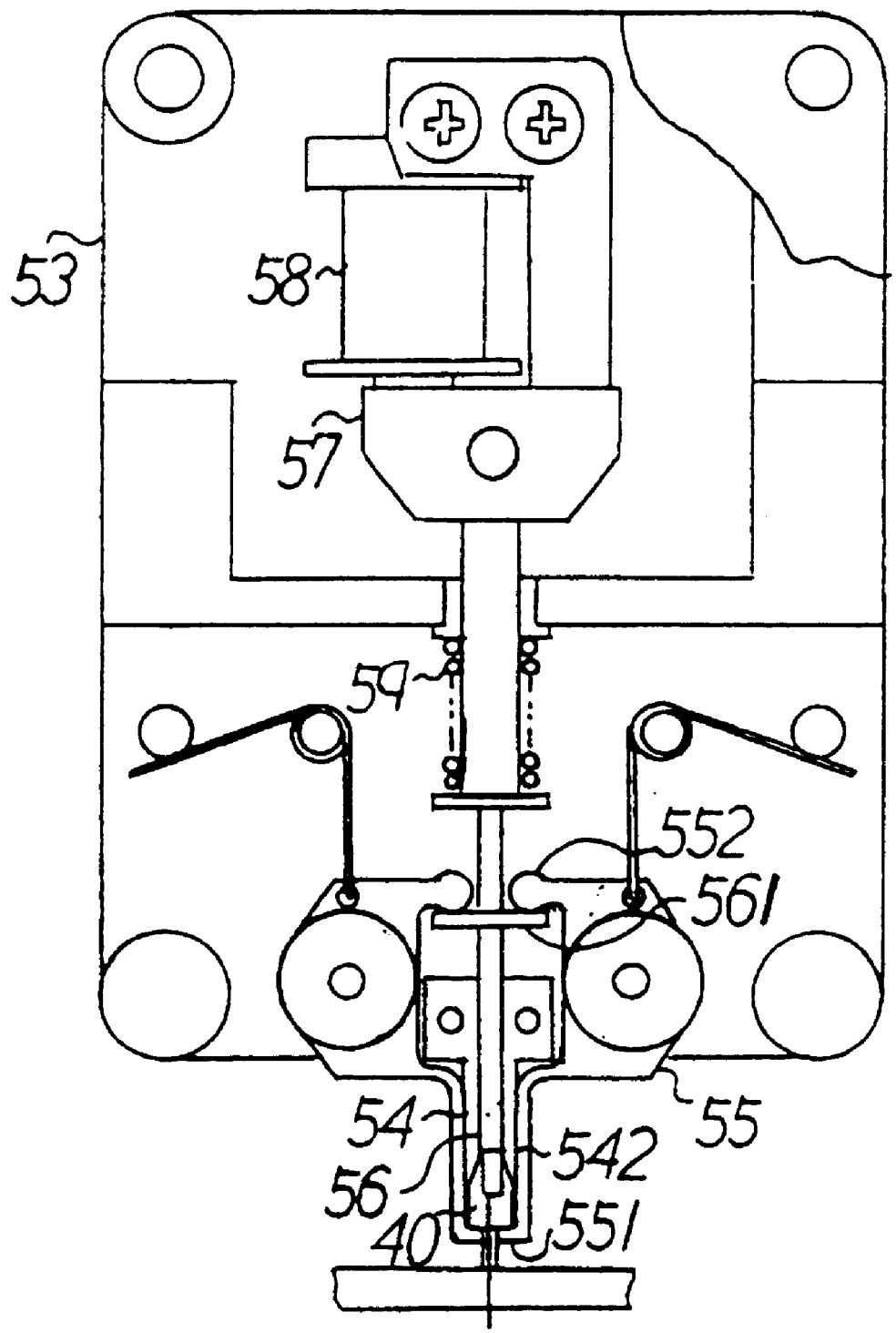
FIG. 25 shows a cross-sectional view for explaining an operation of the connection-pin holding device.
Figure 26:
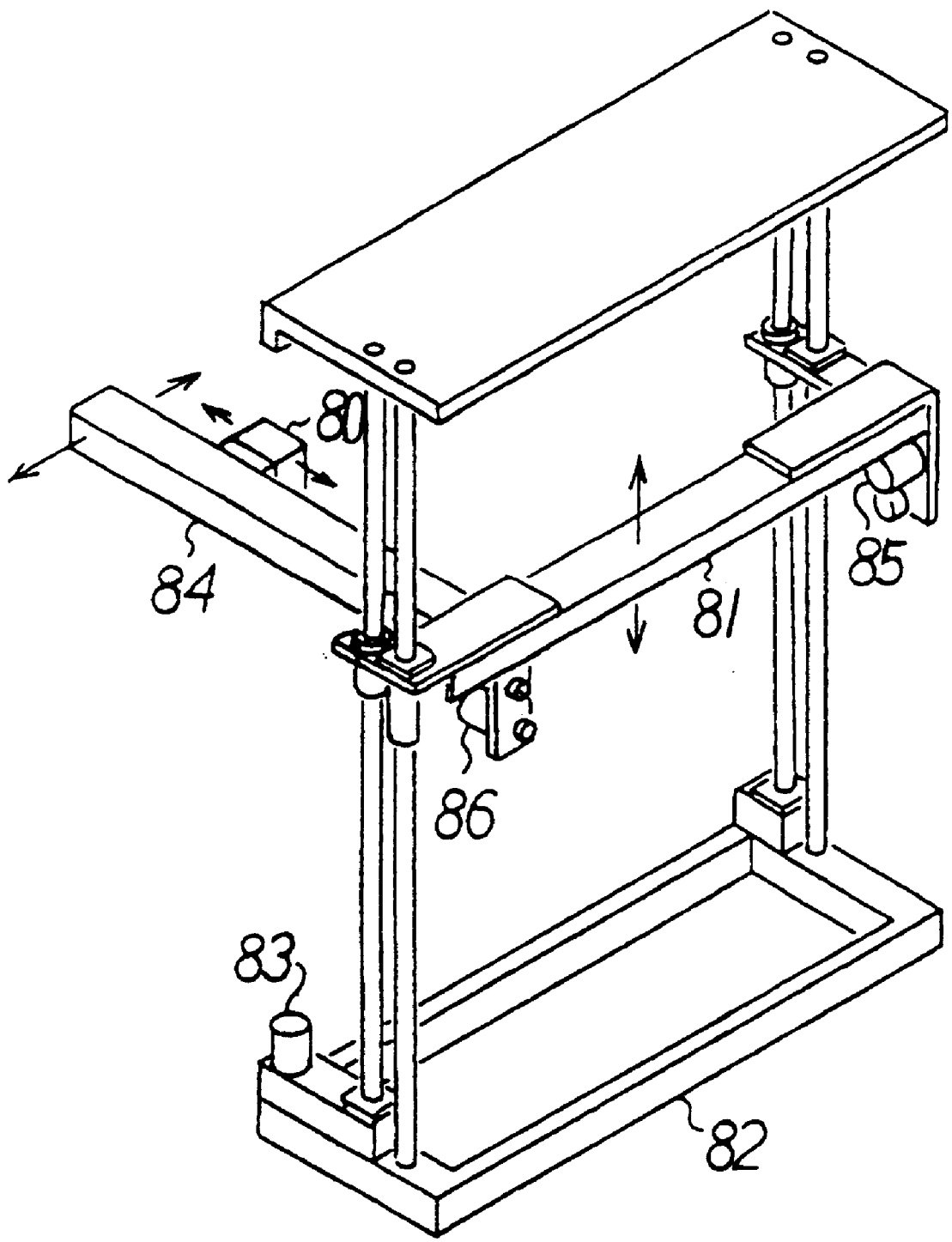
FIG. 26 shows an illustration for explaining a moving mechanism of a bracket.

Next, a description will be given of an embodiment of a connection-pin inserting-and-extracting apparatus having a connection-pin holding device according to the present invention, by referring to FIG. 23A to FIG. 26. FIG. 23A shows a cross-sectional view of the connection-pin inserting-and-extracting apparatus according to the present invention. FIG. 23B shows a cross-sectional view of the connection-pin holding device provided in the connection-pin inserting-and-extracting apparatus shown in FIG. 23A. FIG. 24 shows an illustration for explaining a connection-pin holding mechanism. FIG. 25 shows a cross-sectional view for explaining an operation of the connection-pin holding device. FIG. 26 shows an illustration for explaining a moving mechanism of a bracket.

As shown in FIG. 24, a connection pin 40 is constructed with a cross-shaped connection-pin body 41 made of a resin, and two metallic pins 42. The two metallic pins 42 are inserted and molded into the connection-pin body 41, and are electrically isolated from each other by the connection-pin body 41.

The two metallic pins 42, provided in the connection pin 40, correspond to two through holes 91 formed in a matrix switch board 90. When the connection pin 40 is positioned by the through holes 91, and is inserted thereinto, wiring patterns in both sides of the matrix switch board 90 are connected to each other.

As shown in FIG. 23A, the connection-pin inserting-and-extracting apparatus according to the present invention is constructed with a connection-pin holding device 50, a position detecting part 60, and a slider part 70. The connection-pin holding device 50 and the position detecting part 60 are mounted to a bracket 80 movable in X-, Y-, and Z-axial directions through the slider part 70.

The slider part 70 has a rail 71 which is fixed to the bracket 80 in a vertical direction from the matrix switch board 90, a sliding member 72 slidable along the rail 71, and a pressing coil spring 73 pushing the sliding member 72 toward the matrix switch board 90.

As shown in FIG. 23B, the connection-pin holding device 50 mounted to the sliding member 72 has a connection-pin holding mechanism 51 holding the connection pin 40 for the inserting-and-extracting operation, a driving mechanism 52 driving the connection-pin holding mechanism 51, and a frame 53 having mounted therein the connection-pin holding mechanism 51 and the driving mechanism 52.

The connection-pin holding mechanism 51 has a sleeve 54 positioned at a center thereof and defining a central axis and a pair of swinging members (i.e., a pair of pivotally mounted toggle elements) 55 arranged so as to face each other symmetrically on respective, opposite sides of the sleeve 54. As shown in FIG. 24, in a first, lower end of the sleeve 54, a plurality of slits 541 and nail parts (i.e., arcuate section extensions) 542 are formed, adjacent extensions 542 being spaced by gaps 542' aligned with the respective slits 541 and extending in parallel axial relationship with respect to the axis of sleeve 54. The second end of the sleeve 54 (i.e., the upper end, in FIG. 24) is fixed to the frame 53 by a fixing part 543.

Each swinging member 55 has a rotary, or pivot, connection 55' to the frame 53, an elongated leg 55a extending generally parallel to the axis of the sleeve 54 and protruding from the (bottom) edge of the apparatus 53 and a lever arm 552 extending from the connection 55' generally transversely to the sleeve 54. The elongated legs of the members 55 have respective hooks 551 thereon turned inwardly, toward each other and the respective, opposite sides of the sleeve 54. Respective twisting coil springs 553 mounted on the frame 53 have first end extensions 553a' engaging stops on the swinging members 55 and second end extensions 553b' engaging stops on the frame 53 and exerting a resilient force therebetween so as to resiliently maintain the hooks 551 in the illustrated open, i.e., retracted, positions.

As shown in FIG. 24, the gaps 542', provided in the first (bottom) end of the sleeve 54 in alignment with respective slits 54, have a shape so that the corresponding projections 41' of the connection-pin body 41 can be inserted therein. The hooks 551 provided on the bottom ends of the swinging members 55 are arranged so as to support a lower end of the cross-shaped connection pin body 41 when the hooks 551 are closed.

The driving mechanism 52, as shown in FIG. 23B, includes a push rod 56 inserted into the frame 53 and the sleeve 54, an armature 57 which is made of magnetic substance and is pivotally secured to the upper end of the push rod 56, an electromagnet 58 fixed to the frame 53 so that a magnetic pole 581 of the electromagnet 58 faces the armature 57 at a given distance, and a pressing coil spring 59 (i.e., exerting an axially expanding force) engaged against a ferrule 59a fixedly held by the frame 53 (upwardly, in the figure) (FIG. 25) and a flange 59b on the lower end of the push rod 59 and thus resiliently pushing the push rod 56 axially downwardly so as to move the armature 57 downwardly and away from the electromagnet 58.

Before holding the connection pin 40, a bottom end of the push rod 56, when inserted into the sleeve 54, extends to a position of the nail parts (i.e., extensions) 542. As shown in FIG. 25, when the connection pin 40 is inserted into the sleeve 54, the push rod 56 is moved by an axial travel distance such that the armature 57 contacts the electromagnet 58.

Further, when the push rod 56 moves upwardly, a projection 561, provided in the middle part of the axial length of the push rod 56, engages and moves, and thereby rotates, the lever arms 552. By the rotation of the lever 552 the swinging members (i.e., toggle elements) 55 rotate so as to close the opposed pair of hooks 551 and engage and hold the connection pin 40 therebetween.

At this time, when the electromagnet 58 is supplied with power from a power supply to draw the armature 57 thereto, the connection-pin holding mechanism 51 keeps holding (i.e., maintains the engagement thereby of) the connection pin 40. When the power supply for the electromagnet 58 is turned off, the armature 57 is released from the electromagnet 58 by an operation of the pressing coil spring 59, and, thus, the holding condition terminates and the connection pin 40 is released.

The connection-pin holding device 50, as shown in FIG. 23A, is mounted on the bracket 80 and is movable therewith in the X-, Y- and Z-axial directions through the slider part 70. A moving mechanism of the bracket 80, as shown in FIG. 26, has, for example, a moving frame which is moved by drive motors.

In FIG. 26, a first moving frame 81 moves in the Z-axial direction by the drive of a drive motor 83 fixed to a fixed frame 82, a second moving frame 84 moves in the Y-axial direction by the driving of a drive motor 85 fixed to the first moving frame 81. The bracket 80 also moves in the Y-axial direction by the driving of a drive motor 86 fixed to the second moving frame 84.

As shown in FIG. 23A, the connection-pin holding device 50 is further provided with a position detecting part 60 detecting a position of the through holes 91 into which the connection pin 40 is inserted or extracted. The position detecting part 60 includes an image pickup device (not shown) detecting an image on the matrix switch board 90 as an electrical signal.

When the connection pin 40 is inserted into the matrix switch board 90, after the position detecting part 60 detects the position of the through holes 91, the bracket 80 is controlled to move in the X and Y directions. Namely, to position the connection-pin holding device 50 holding the connection pin 40 at the designated position, the bracket 80 is controlled to move toward the designated matrix switch board 90.

As discussed above, the connection-pin holding device 50 is mounted on the sliding member 72 of the slider part 70, the rail 71 of which is fixed to the bracket 80. The connection-pin holding device 50 and the sliding member 72 are always pushed toward the matrix switch board 90 by the pressing coil spring 73.

When the connection pin 40 contacts the matrix switch board 90, the sliding member 72 moves on the rail 71 against the pressing coil spring 73 (FIG. 23A). When a reaction force of the pressing coil spring 73 exceeds a strength required for inserting the connection pin 40, the sliding member 72 is pushed out and the connection pin 40 is inserted into the through holes 91.

Spring pressure of the pressing coil spring 73 is adjusted so as to be larger than the strength required for inserting the connection pin 40 in an operation position of the position-detecting sensor 74. The position-detecting sensor 74 is constructed with a photo interrupter 75 fixed to the rail 71, and a photo plate 76 fixed to the connection-pin holding device 50.

When the connection pin 40 is extracted from the through holes 91, in the same way, after the position detecting part 60 detects the position of the connection pin 40 to be extracted, the bracket 80 is controlled to move in the X and Y directions. Namely, to position the connection-pin holding device 50 by the connection pin 40 to be extracted, the bracket 80 is controlled to move toward the designated matrix switch board 90.

The rail 71 of the slider part 70 includes, in the side near the matrix switch board 90, a stopper 77 contacting the sliding member 72 to prevent it from dropping. When the bracket 80 is controlled to move away from the matrix switch board 90, the connection pin 40 is extracted from the matrix switch board 90.

In this way, in the connection-pin holding device of the connection-pin inserting-and-extracting apparatus according to the present invention, the connection pin 40 to be inserted is supported by the sleeve 54 so as not to fall. Further, by the push rod 56 fixed to the frame 53 through the armature 57 and the electromagnet 58, the connection pin 40 is inserted.

When the connection pin 40, previously inserted, is to be extracted from the matrix switch board 90, the head part of the connection pin 40 is hooked by the hooks 551 of the swinging members 55. Therefore, different from a prior-art connection-pin holding device, it is unnecessary to hold the connection pin 40 by applying a large force to the holding mechanism for inserting and extracting the connection pin.

Further, the connection-pin holding mechanism 51 is constructed with the sleeve 54 and the pair of swinging members 55. In the one end of the sleeve 54, the slits 541 and the nail parts 542 are formed, and the other end thereof is mounted to the frame 53. The swinging member 55 has the hook 551 and the lever 552, and the middle part of the swinging member 55 is mounted to the frame 53. Therefore, the connection-pin holding mechanism 51 may be extremely miniaturized, and may be manufactured without complex manufacturing techniques. As a result, the cost of the connection-pin holding device may be reduced.

Further, when the connection pin 40 is inserted into the sleeve 54, the push rod 56 moves and the armature 57 contacts the electromagnet 58. Therefore, the electromagnet 58 may have the smallest drawing force by which the armature 57 cannot separate away from the electromagnet 58 in the operating condition of the pressing coil spring 59. As compared to the prior-art electromagnetic solenoid generating an even holding force, extreme miniaturization and cost reduction of the connection-pin holding device are expected.

Still further, by providing the slits 541 in the sleeve 54, the nail parts (extensions) 542 formed in the lower end of the sleeve 54 may have elasticity. Therefore, even if the position of the sleeve 54 shifts from the position of the connection pin 40, the position shift may be compensated for by flexibility of the nail parts (extensions) 542. Accordingly, the frame 53 does not need to have a double structure, and, thus, miniaturization and cost reduction of the connection-pin holding device are further expected.

Furthermore, the connection-pin inserting-and-extracting apparatus can hold the cross-shaped connection pin 40 having the two pins with sufficient holding strength, and can insert the connection pin into the matrix switch board 90 with high positioning precision. Also, the connection-pin inserting-and-extracting apparatus may have the connection-pin holding device of which the miniaturization and the cost reduction are expected.

Further, the present invention is not limited to these embodiments, but other variations and modifications may be made without departing from the scope of the present invention.

What is claimed is:

1. A connection-pin inserting-and-extracting apparatus including a connection-pin holding device which holds a connection pin for an inserting-and-extracting process and into-and-from a matrix switch board and has a holding mechanism holding said connection pin, a driving mechanism driving the holding mechanism, and a frame having mounted thereon the holding mechanism and the driving mechanism, wherein:

said holding mechanism comprises:
a sleeve having a first end part in which slits and nail parts are formed, and a second, opposite end part in which is formed a fixing parts mounted to said frame,
a pair of swinging members facing each other, each including a hook and a lever, a middle part of each thereof being rotatably mounted to said frame, and the swinging members being normally rotated so as to open said hooks;

said driving mechanism comprises:
a push rod supported by said frame and said sleeve in a slidable manner,
an armature, of a magnetic substance, mounted to one end part of said push rod in a swinging manner,
an electromagnet fixed to the frame so that a magnetic pole of the electromagnet faces said armature, and
said push rod being resiliently urged so as to separate said armature from said electromagnet; and when a portion of said connection pin is inserted into a gap between said nail parts of the sleeve, said push rod moves relatively to the sleeve, the swinging members and the electromagnet, causing said armature to contact said electromagnet and causing projections, formed on the push rod, to push respective said levers of the swinging members thereby to close said hooks.

2. The apparatus as claimed in claim 1, further comprising:
a position detecting part detecting a position in said matrix switch board where a connection pin is to be inserted or extracted; and
a slider part moving at least said connection-pin holding device in a vertical direction relatively to said matrix switch board.

3. The apparatus as claimed in claim 2, wherein said slider part comprises:
a rail fixed to a bracket movable in X-, Y-, and Z-axial directions and disposed at a position displaced in a vertical direction from said matrix switch board;
a sliding member having mounted thereon said connection-pin holding device and being movable along said rail;
a coil spring, fixed to said rail, resiliently pushing said sliding member toward said matrix switch board; and
a position-detecting sensor, operative when said sliding member has moved and arrives at a given position against said resilient pushing of coil spring, said position-detecting sensor comprising:
a photo interrupter fixed to said rail, and
a photo plate fixed to said connection-pin holding device.

4. The apparatus as claimed in claim 2, wherein said position detecting part is mounted on said frame of the connection-pin holding device and has an image pickup device, detecting an image on said matrix switch board as an electrical signal.

5. The apparatus as claimed in claim 1, further comprising coil springs mounted respectively between the pair of swinging members and the frame and which push the swinging members so as to normally rotate the swinging members and thereby open said hooks.

6. The apparatus as claimed in claim 1, further comprising:
a coil spring resiliently urging said push rod so as to separate said armature from said electromagnet.

7. An apparatus selectively handling a connector having a body defining an axis and a connection pin extending from the body parallel to the body axis, the body having a protrusion extending transversely to the body axis, the apparatus comprising:

a frame;
a sleeve defining a sleeve axis and having a sleeve side wall with first and second opposite ends, the sleeve side wall having a gap therein, corresponding to each protrusion of the connector body, extending parallel to the sleeve axis from the first end of the sleeve, the sleeve being slidable in coaxial relationship along the body of a selected connector and each protrusion of the body being received in the corresponding gap, the second end of the sleeve being affixed to the frame;

a pair of toggle members having respective first and second ends and rotatably mounted to said frame at respective, central portions thereof for rotation about respective parallel axes, transverse to and disposed symmetrically on opposite sides of the sleeve axis, the toggle members having respective leg portions, extending generally parallel to the sleeve axis from the central portions and to the first ends thereof with corresponding hook portions on the first ends thereof extending in opposed relationship transversely to the sleeve axis, and respective lever arms, extending from the central portions toward the sleeve axis, the toggle members being rotated by resilient forces applied to the lever arms thereby to dispose the hook portions thereof at a retracted state;

a push rod having first and second ends and supported by the frame for sliding movement relatively to the frame along a travel distance between first and second positions, within the sleeve and along the sleeve axis, the push rod being resiliently biased to the first position with the first end thereof substantially at the first end of the sleeve;

a magnetic armature mounted on the second end of the push rod; and an electromagnet fixed to the frame and positioned in spaced relationship to the magnetic armature by a distance corresponding to a travel distance of the push rod when the push rod is at the first position, the push rod engaging the.connector body and the apparatus moving axially along the connector body and relatively to the push rod by the travel distance, the push rod engaging and rotating the lever arms and thereby rotating the toggle members for engaging the hook portions of the toggle members with the connector body and disposing the armature adjacent the electromagnet.

8. The apparatus as recited in claim 7, wherein
plural gaps in the sleeve can be respectively associated with plural protrusions of the connector.

9. The apparatus as recited in claim 8, wherein plural gaps in the sleeve side wall define respective extensions therebetween.

10. The apparatus as recited in claim 9, wherein the sleeve further comprises plural slits in the side wall thereof respectively associated with and extending axially from respective gaps, increasing flexibility of respective extensions defined thereby.

11. The apparatus as claimed in claim 7, further comprising:
   a position detecting part detecting a position in a matrix switch board where a connection pin is to be inserted or extracted; and
   a slider part moving at least a connection-pin holding mechanism in a vertical direction relatively to said matrix switch board.

12. The apparatus as claimed in claim 11, wherein said slider part comprises:
   a rail fixed to a bracket movable in X-, Y-, and Z-axial directions and disposed at a position displaced in a vertical direction from said matrix switch board;
   a sliding member having mounted thereon said connection-pin holding mechanism and being movable along said rail;
   a coil spring, fixed to said rail, resiliently pushing said sliding member toward said matrix switch board; and
   a position-detecting sensor, operative when said sliding member has moved and arrives at a given position against said resilient pushing of coil spring, said position-detecting sensor comprising:
      a photo interrupter fixed to said rail, and
      a photo plate fixed to said connection-pin holding device.

13. The apparatus as claimed in claim 11, wherein said position detecting part is mounted on said frame of the connection-pin holding mechanism and has an image pickup device, detecting an image on said matrix switch board as an electrical signal.

14. An apparatus selectively handling a connector having a body defining an axis and a pin extending from the body parallel to the body axis and the body further having at least one protrusion extending transversely to the axis, the apparatus comprising:
   a frame;
   a sleeve defining a sleeve axis and having a sleeve wall with first and second opposite ends, the sleeve wall having a gap therein corresponding to each protrusion of the connector body and extending parallel to the sleeve axis from the first end of the sleeve, the sleeve being slidable in coaxial relationship along the body of a selected connector and each protrusion of the body being received in a corresponding gap, the second end of the sleeve being affixed to the frame;
   a push rod moveable along the sleeve axis and resiliently biased to a first position disposing a first end of the push rod substantially at the first end of the sleeve;
   an armature supported on a second end of the push rod, the first end of the push rod contacting a connector body and the apparatus moving along the body axis and moving the push rod to a second position relatively to the frame;
   an electromagnet fixed to the frame and positioned to be contacted by the armature in the second position of the push rod and, when electrically energized, magnetically holding the armature and thereby maintaining the push rod at the second position; and
   toggle members pivotally connected to the frame and having respective, opposed hook portions thereon disposed in a retracted state in the first push rod position and actuated, by the relative movement of the push rod to the second push rod position, to an engaged state holding the contacted connector body.

15. The apparatus as recited in claim 14, wherein
   plural gaps in the sleeve respectively associated with plural protrusions of the connector.

16. The apparatus as recited in claim 15, plural successive gaps in the sleeve side wall define respective side wall extensions therebetween.

17. The apparatus as recited in claim 16, wherein the sleeve further comprises plural slits in the side wall thereof respectively associated with and extending axially from respective gaps, increasing flexibility of respective extensions defined thereby.

18. The apparatus as claimed in claim 14, further comprising:
   a position detecting part detecting a position in a matrix switch board at which a connection pin of a connector is to be inserted or extracted; and
   a slider part slidingly supporting the frame and, therewith, the sleeve, the push rod with the armature thereon, the electromagnet and the toggle members, for movement in a vertical direction relatively to the position in the matrix switch board into which the connection pin is to be inserted or from which the connection pin is to be extracted.

19. An apparatus selectively handling a connector having a body with at least one protrusion, the apparatus comprising:
   a frame;
   a sleeve having a sleeve wall, defining a sleeve axis, with first and second opposite ends and a gap in the first end respectively corresponding to each protrusion of the connector body, each protrusion being receivable in the respectively corresponding gap;
   a push rod, having first and second ends, slidably supported within the sleeve for movement along the sleeve axis, relatively to the sleeve and the frame;
   an armature of a magnetic substance, supported on the second end of the push rod and movable therewith;
   an electromagnet fixed to the frame and positioned so as to face the armature; and
   toggle members pivotally connected to the frame and having respective, opposed hook portions thereof resiliently urged to a retracted state and pushed by the push rod so as to rotate and close said hooks, due to movement of the frame relatively to the push rod, when the first end of the push rod engages the connector and the sleeve, moving with the frame, receives the connector body therein and each protrusion of the connector body is received in the respectively corresponding gap in the sleeve.

* * * * *

UNITED STATES PATENT AND TRADEMARK OFFICE
CERTIFICATE OF CORRECTION

PATENT NO.: 6,138,345
DATED : October 31, 2000
INVENTOR(S): Toshihiro SUZUKI et al.

It is certified that error appears in the above-identified patent and that said Letters Patent is hereby corrected as shown below:

Col. 21, line 10, change "parts" to --part,--.

Col. 22, line 49, change "the.connector" to --the connector--.

Col. 24, line 11, change "plural successive" to --wherein plural--.

Signed and Sealed this

Eighth Day of May, 2001

*Attest:*

NICHOLAS P. GODICI

*Attesting Officer*     Acting Director of the United States Patent and Trademark Office